(12) United States Patent
Tanabe

(10) Patent No.: US 10,326,320 B2
(45) Date of Patent: *Jun. 18, 2019

(54) POWER SUPPLY APPARATUS, ELECTRONIC DEVICE, CONTROL METHOD, PROGRAM, AND RECORDING MEDIUM

(71) Applicant: CANON KABUSHIKI KAISHA, Tokyo (JP)

(72) Inventor: Akihiro Tanabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/056,290

(22) Filed: Aug. 6, 2018

(65) Prior Publication Data

US 2018/0342909 A1 Nov. 29, 2018

Related U.S. Application Data

(63) Continuation of application No. 14/765,238, filed as application No. PCT/JP2014/000652 on Feb. 7, 2014, now Pat. No. 10,069,349.

(30) Foreign Application Priority Data

Feb. 12, 2013 (JP) .................. 2013-024637

(51) Int. Cl.
*H02J 7/00* (2006.01)
*H02J 50/80* (2016.01)
*H02J 50/12* (2016.01)
*H02J 7/02* (2016.01)
*H02J 7/04* (2006.01)
*H02J 50/05* (2016.01)
*H02J 50/10* (2016.01)

(52) U.S. Cl.
CPC ............ *H02J 50/80* (2016.02); *H02J 7/0004* (2013.01); *H02J 7/025* (2013.01); *H02J 7/04* (2013.01); *H02J 50/12* (2016.02); *H02J 50/05* (2016.02); *H02J 50/10* (2016.02); *H02J 2007/0096* (2013.01)

(58) Field of Classification Search
CPC .................................................. H02J 7/0025
USPC ....................................................... 320/108
See application file for complete search history.

(56) References Cited

U.S. PATENT DOCUMENTS

| 7,893,660 B2 | 2/2011 | Veselic et al. |
| 7,979,553 B2 | 7/2011 | Fujita |
| 7,999,514 B2 | 8/2011 | Veselic et al. |
| 8,432,293 B2 * | 4/2013 | Symons .................. H02J 7/025 340/854.8 |
| 2005/0157702 A1 * | 7/2005 | Motohashi ........ H04L 29/06027 370/352 |

* cited by examiner

*Primary Examiner* — Samuel Berhanu
(74) *Attorney, Agent, or Firm* — Canon USA, Inc., IP Division

(57) ABSTRACT

A power supply apparatus includes a power supply unit configured to perform power supply, a communication unit configured to perform communication, and a control unit configured to control, based on data received by the communication unit, a power supply for an electronic device.

20 Claims, 12 Drawing Sheets

FIRST COMMAND (READ COMMAND OF C-APUD)

SECOND COMMAND (UPDATE COMMAND OF C-APUD)

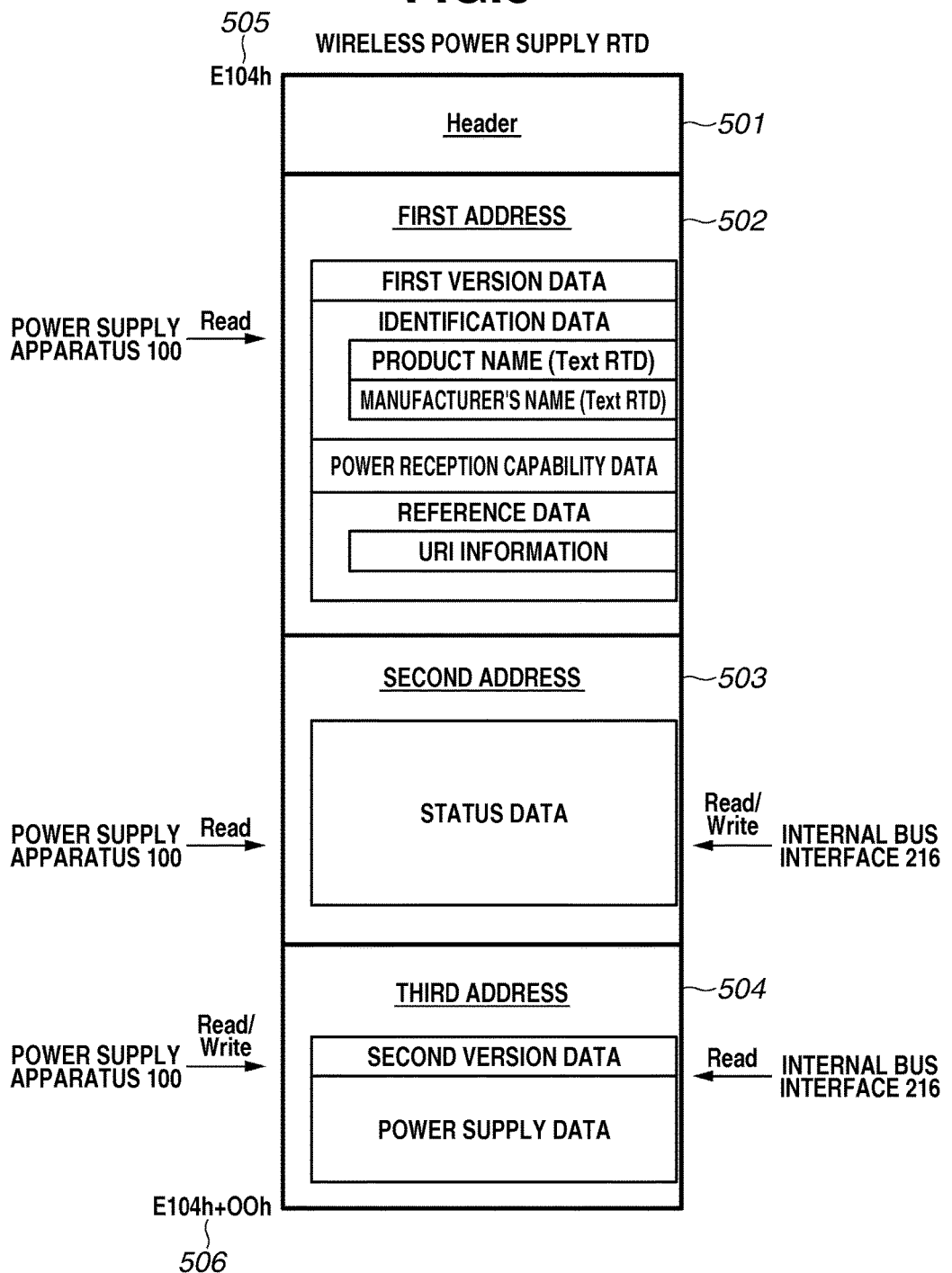

FIRST RESPONSE DATA

SECOND RESPONSE DATA

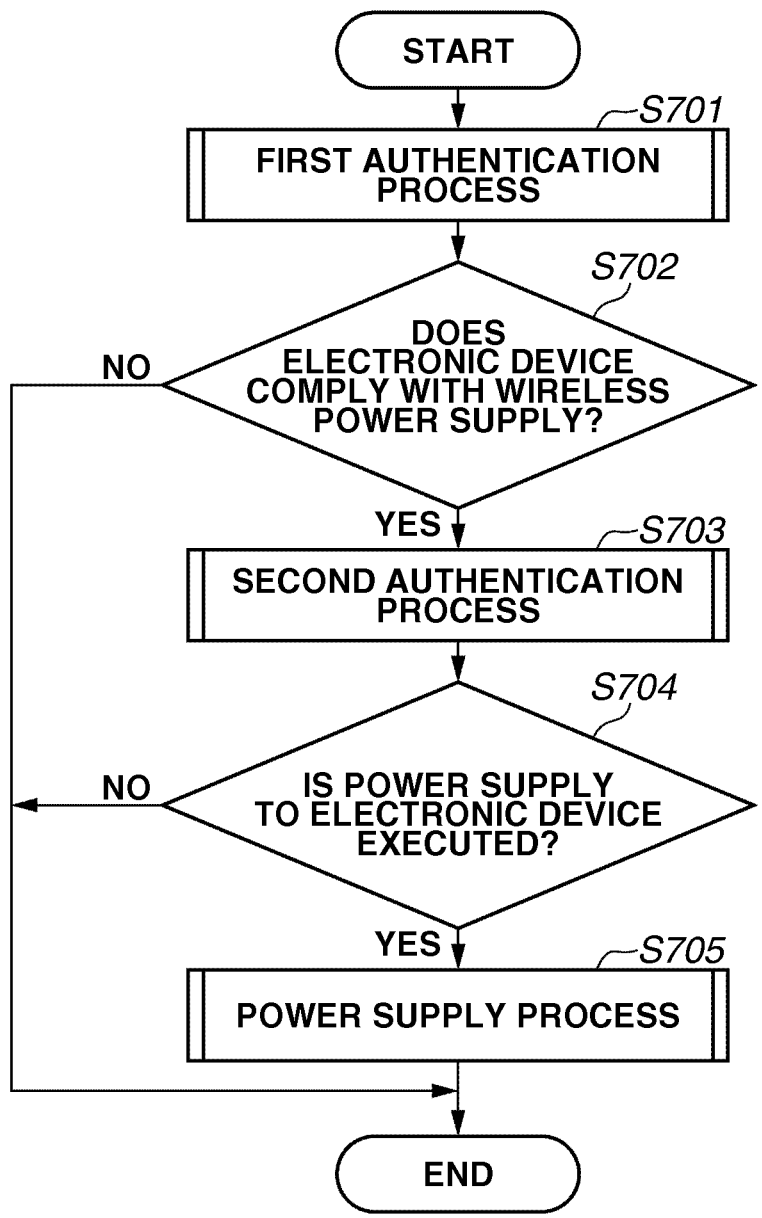

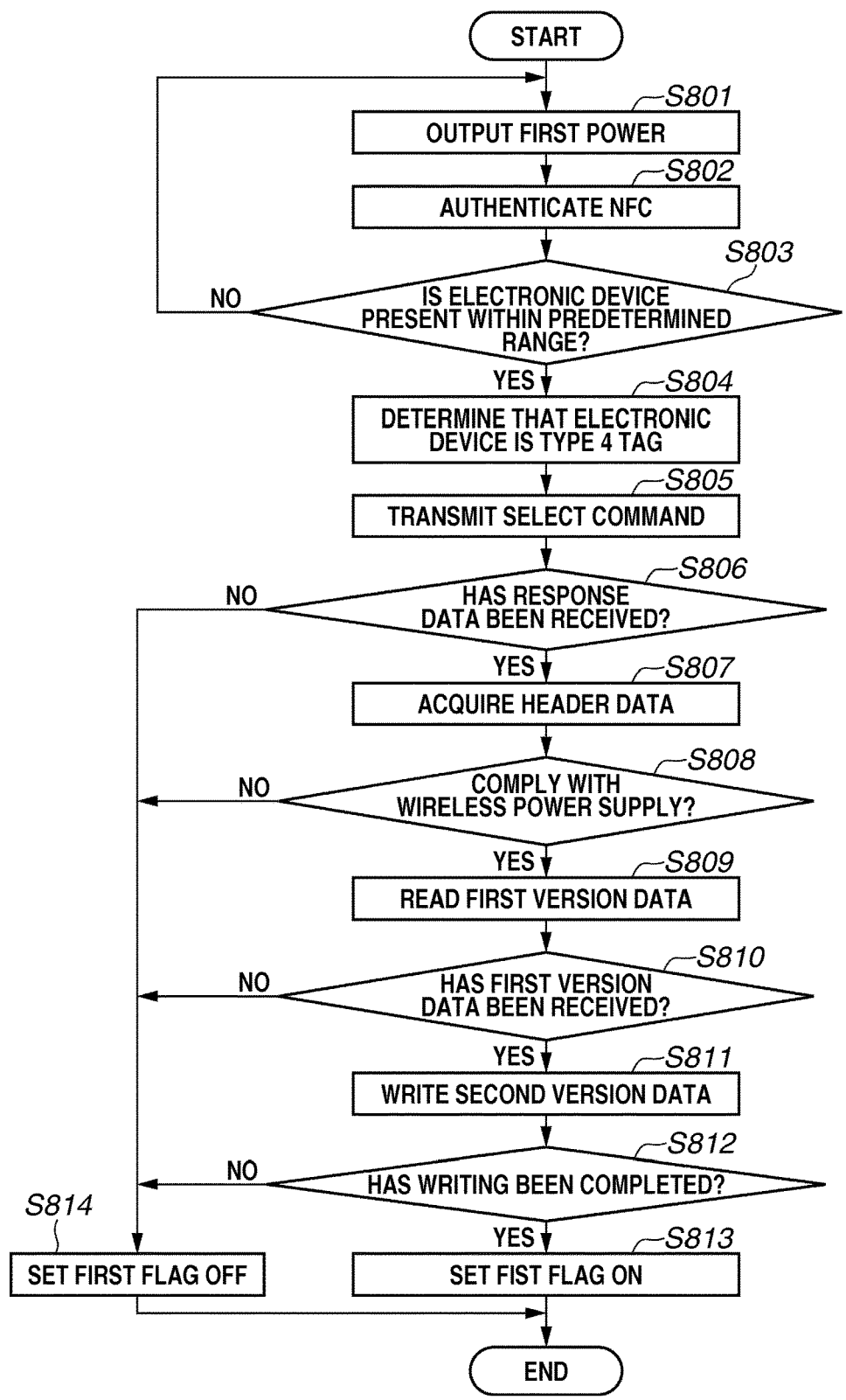

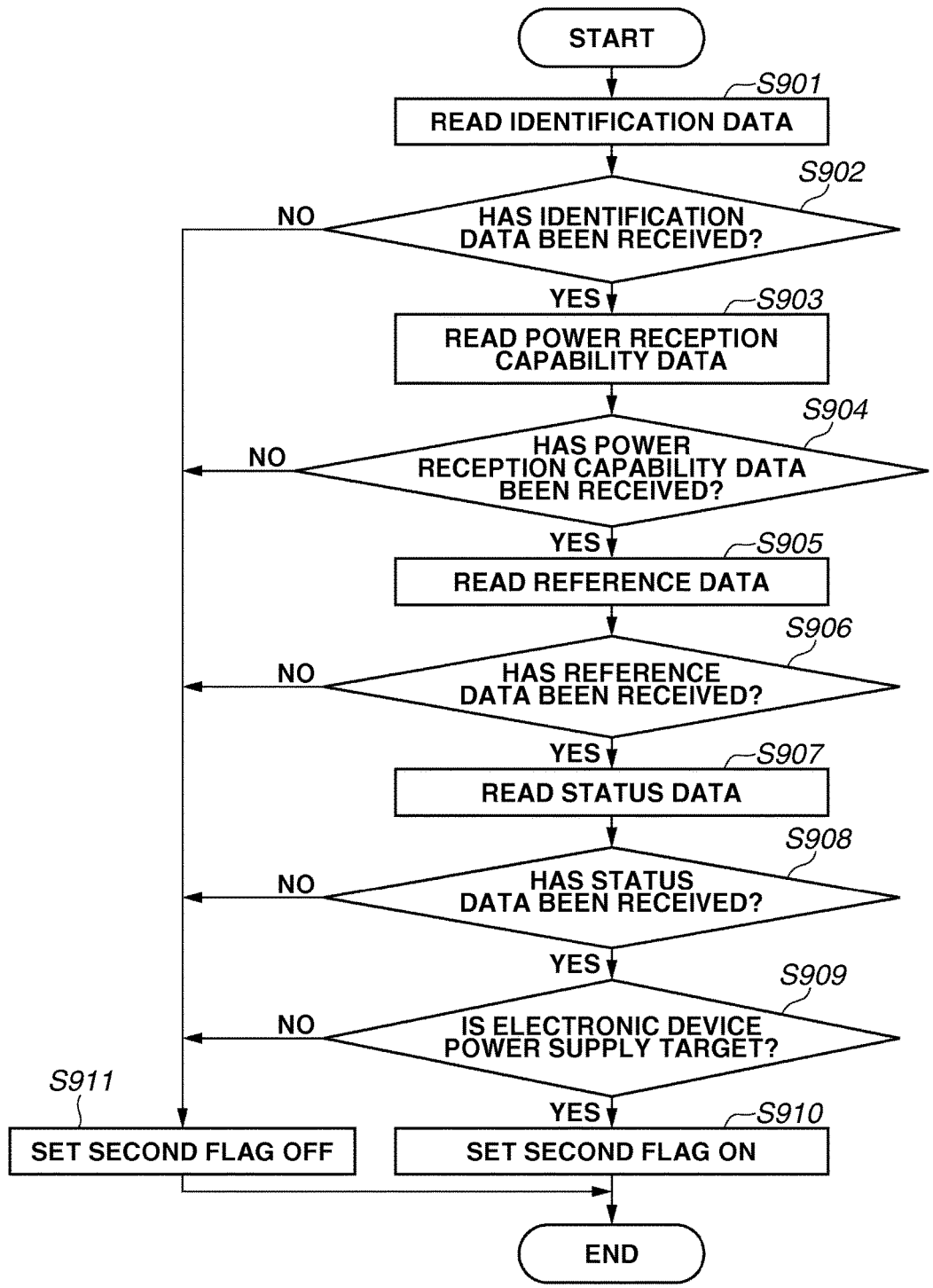

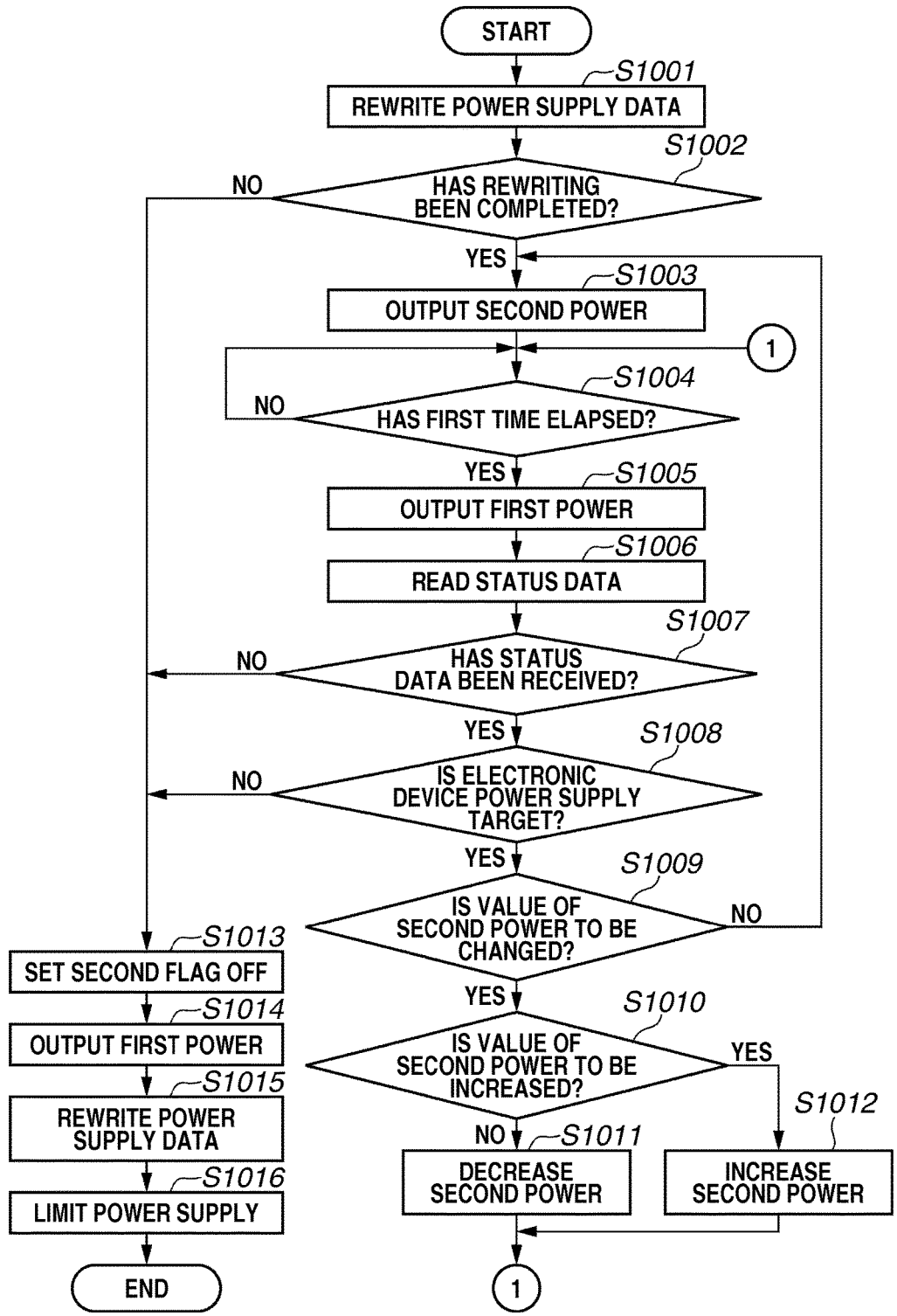

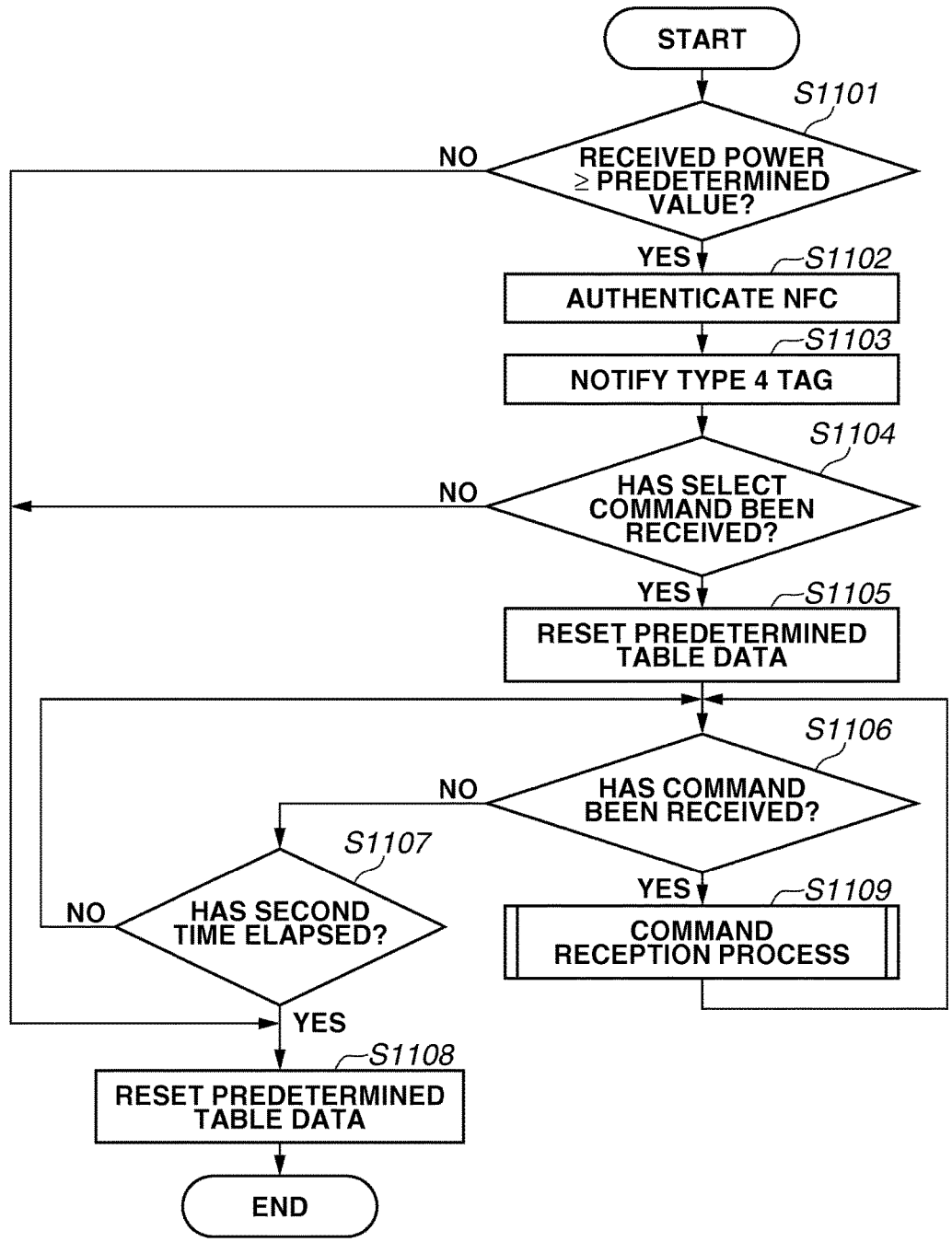

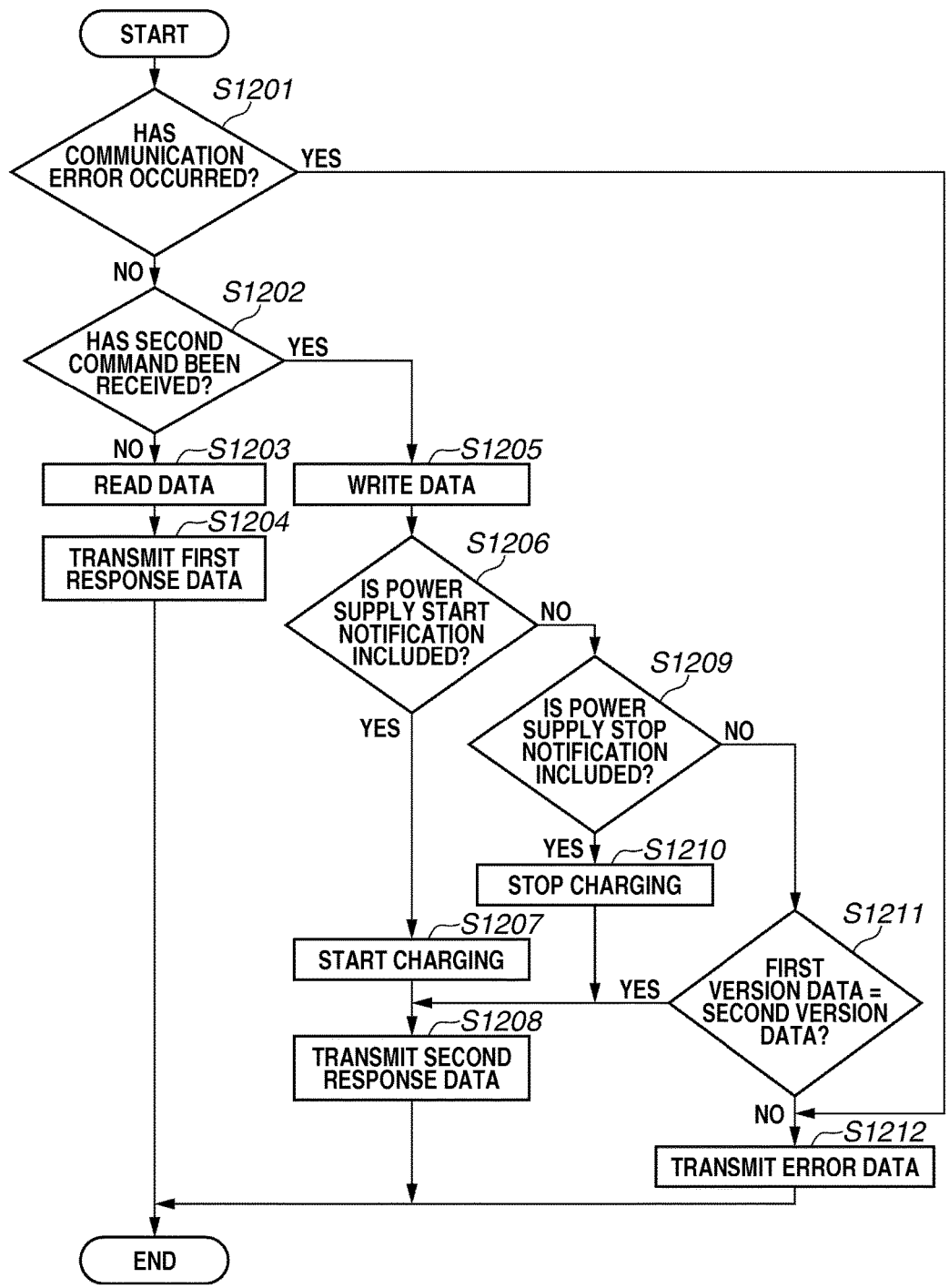

POWER SUPPLY APPARATUS, ELECTRONIC DEVICE, CONTROL METHOD, PROGRAM, AND RECORDING MEDIUM

CROSS-REFERENCE TO RELATED APPLICATION

This application is a Continuation of U.S. patent application Ser. No. 14/765,238 filed Jul. 31, 2015, which is a National Phase Application of International Application PCT/JP2014/000652, filed Feb. 7, 2014, which claims the benefit of Japanese Patent Application No. 2013-024637, filed Feb. 12, 2013. The disclosures of the above-named applications are hereby incorporated by reference herein in their entirety.

TECHNICAL FIELD

The present invention relates to an apparatus or the like that performs communication to control wireless power supply.

BACKGROUND ART

Recently, there has been known a power supply system that includes a power supply apparatus for supplying power by wireless without connection by a connector and an electronic device for receiving the power supplied from the power supply apparatus by wireless. In such a power supply system, an electronic device that charges a battery by using the power supplied from the power supply apparatus is known (refer to PTL 1).

CITATION LIST

Patent Literature

[PTL 1]
Japanese Patent Application Laid-Open NO. 2010-39283

SUMMARY OF INVENTION

Technical Problem

In such a power supply system, no consideration has been given to communication performed between the power supply apparatus and the electronic device and control of wireless power supply performed by the power supply apparatus using a result of the communication with the electronic device. Nor any consideration has been given to charging of the battery performed by the electronic device using the result of the communication with the power supply apparatus. Consequently, the power supply apparatus has been unable to appropriately control power supply to the electronic device because it cannot accurately detect a status of the electronic device. The electronic device cannot detect a status of the wireless power supply performed by the power supply apparatus. Thus, the electronic device has been unable to appropriately control charging of the battery.

It is therefore an object of the present invention to enable appropriate charging at an electronic device by controlling wireless power supply to the electronic device according to communication between a power supply apparatus and the electronic device.

Solution to Problem

According to an aspect of the present invention, a power supply apparatus includes a power supply unit configured to perform wireless power supply based on a first frequency, a communication unit configured to perform communication based on a second frequency, and a control unit configured to control the communication unit to transmit, before predetermined power is supplied to an electronic device, a first command for acquiring at least one of data corresponding to a first address and data corresponding to a second address from the electronic device, to the electronic device, wherein the control unit determines whether the electronic device is adaptable to the power supply unit by using the data corresponding to the first address, wherein the control unit determines whether to perform a power supply process for supplying the predetermined power to the electronic device by using the data corresponding to the second address, and wherein, in a case where the electronic device is adaptable to the power supply unit, and when the power supply process is started, the control unit controls the communication unit to transmit a second command including data corresponding to a third address to the electronic device to notify the electronic device of starting to supply the predetermined power.

According to another aspect of the present invention, an electronic device includes a power reception unit configured to receive power based on a first frequency, a communication unit configured to perform communication based on a second frequency, a storage unit configured to store a predetermined table including data corresponding to a first address, data corresponding to a second address, and data corresponding to a third address, a reading unit configured to read, when a first command for acquiring at least one of the data corresponding to the first address and the data corresponding to the second address from the electronic device is received from a power supply apparatus, the data from the predetermined table according to the first command, a writing unit configured to write, in a case where a second command including the data corresponding to the third address is received from the power supply apparatus, the data included in the second command in the predetermined table, and a control unit configured to control, in a case where the second command including the data corresponding to the third address is received from the power supply apparatus, charging of a battery after data indicating starting to supply predetermined power by the power supply apparatus has been written in the predetermined table.

According to yet another aspect of the present invention, a control method for controlling a power supply apparatus including a power supply unit configured to perform wireless power supply based on a first frequency and a communication unit configured to perform communication based on a second frequency, includes controlling the communication unit to transmit, before predetermined power is supplied to an electronic device, a first command for acquiring at least one of data corresponding to a first address and data corresponding to a second address from the electronic device, to the electronic device, determining whether the electronic device is adaptable to the power supply unit by using the data corresponding to the first address, determining whether to perform a power supply process for supplying the predetermined power to the electronic device by using the data corresponding to the second address, and controlling the communication unit to transmit, when the electronic device is adaptable to the power supply unit, in a case of starting the power supply process, a second command including data corresponding to a third address to the electronic device to notify the electronic device of starting to supply the predetermined power.

According to yet another aspect of the present invention, a method for controlling an electronic device including a power reception unit configured to receive power based on a first frequency, a communication unit configured to perform communication based on a second frequency, and a storage unit configured to store a predetermined table including data corresponding to a first address, data corresponding to a second address, and data corresponding to a third address, includes reading, in a case where a first command for acquiring at least one of the data corresponding to the first address and the data corresponding to the second address from the electronic device is received from a power supply apparatus, the data from the predetermined table according to the first command, writing, in a case where a second command including the data corresponding to the third address is received from the power supply apparatus, the data included in the second command in the predetermined table, and controlling, in a case where the second command including the data corresponding to the third address is received from the power supply apparatus, charging of a battery after data indicating starting to supply predetermined power by the power supply apparatus has been written in the predetermined table.

According to yet another aspect of the present invention, a computer readable recording medium recording a program for causing a computer to execute a method, includes controlling an electronic device including a power reception unit configured to receive power based on a first frequency, a communication unit configured to perform communication based on a second frequency, and a storage unit configured to store a predetermined table including data corresponding to a first address, data corresponding to a second address, and data corresponding to a third address, reading, in a case where a first command for acquiring at least one of the data corresponding to the first address and the data corresponding to the second address from the electronic device is received from a power supply apparatus, the data from the predetermined table according to the first command, writing, in a case where a second command including the data corresponding to the third address is received from the power supply apparatus, the data included in the second command in the predetermined table, and controlling, in a case where the second command including the data corresponding to the third address is received from the power supply apparatus, charging of a battery after data indicating starting to supply predetermined power by the power supply apparatus has been written in the predetermined table.

Advantageous Effects of Invention

According to the present invention, charging can be appropriately performed at the electronic device by controlling the wireless power supply to the electronic device according to the communication between the power supply apparatus and the electronic device.

BRIEF DESCRIPTION OF DRAWINGS

FIG. 5 is a diagram illustrating an example of a predetermined table according to the first embodiment.
FIG. 7 is a flowchart illustrating an example of a control process according to the first embodiment.
FIG. 8 is a flowchart illustrating an example of a first authentication process according to the first embodiment.
FIG. 9 is a flowchart illustrating an example of a second authentication process according to the first embodiment.
FIG. 10 is a flowchart illustrating an example of a power supply process according to the first embodiment.
FIG. 11 is a flowchart illustrating an example of a communication process according to the first embodiment.
FIG. 12 is a flowchart illustrating an example of a command reception process according to the first embodiment.

DESCRIPTION OF EMBODIMENTS

[First Embodiment]

Hereinafter, the exemplary embodiments of the present invention will be described in detail with reference to the accompanying drawings.

Figure 1:
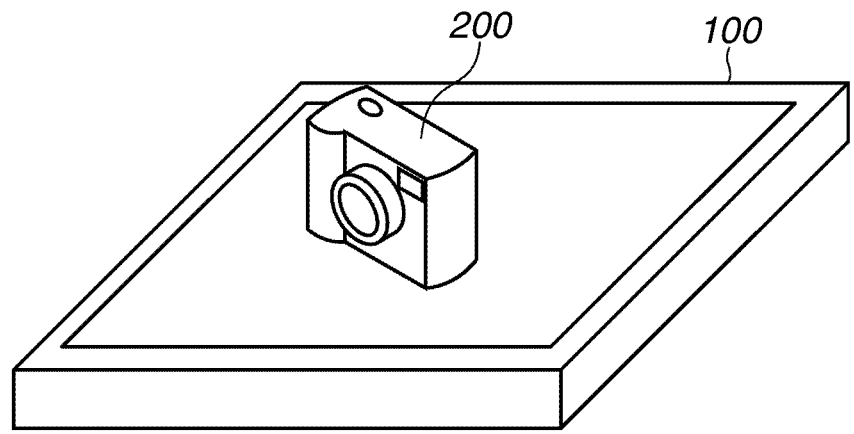
FIG. 1 is a diagram illustrating an example of a power supply system according to the first embodiment.

First embodiment according to the present invention will be described in detail below with reference to the drawings. As illustrated in FIG. 1, a power supply system according to the first embodiment includes a power supply apparatus 100 and an electronic device 200. In the power supply system according to the first embodiment, when the electronic device 200 is present within a predetermined range, the power supply apparatus 100 supplies power to the electronic device 200 by wireless. When the electronic device 200 is present within the predetermined range, the electronic device 200 can receive the power output from the power supply apparatus 100 by wireless. When the electronic device 200 is not present within the predetermined range, the electronic device 200 cannot receive any power from the power supply apparatus 100. The predetermined range is presumed to be a range within which the power supply apparatus 100 can communicate with the electronic device 200. The power supply apparatus 100 can supply power to a plurality of electronic devices by wireless.

The electronic device 200 may be an imaging apparatus, a reproduction apparatus, or a communication apparatus such as a mobile phone or a smartphone. The electronic device 200 may be an apparatus that includes a battery. The electronic device 200 may be an automobile, a display, or a personal computer. The electronic device 200 may bean apparatus operated by using the power supplied from the power supply apparatus 100 even when no battery is attached.

Figure 2:
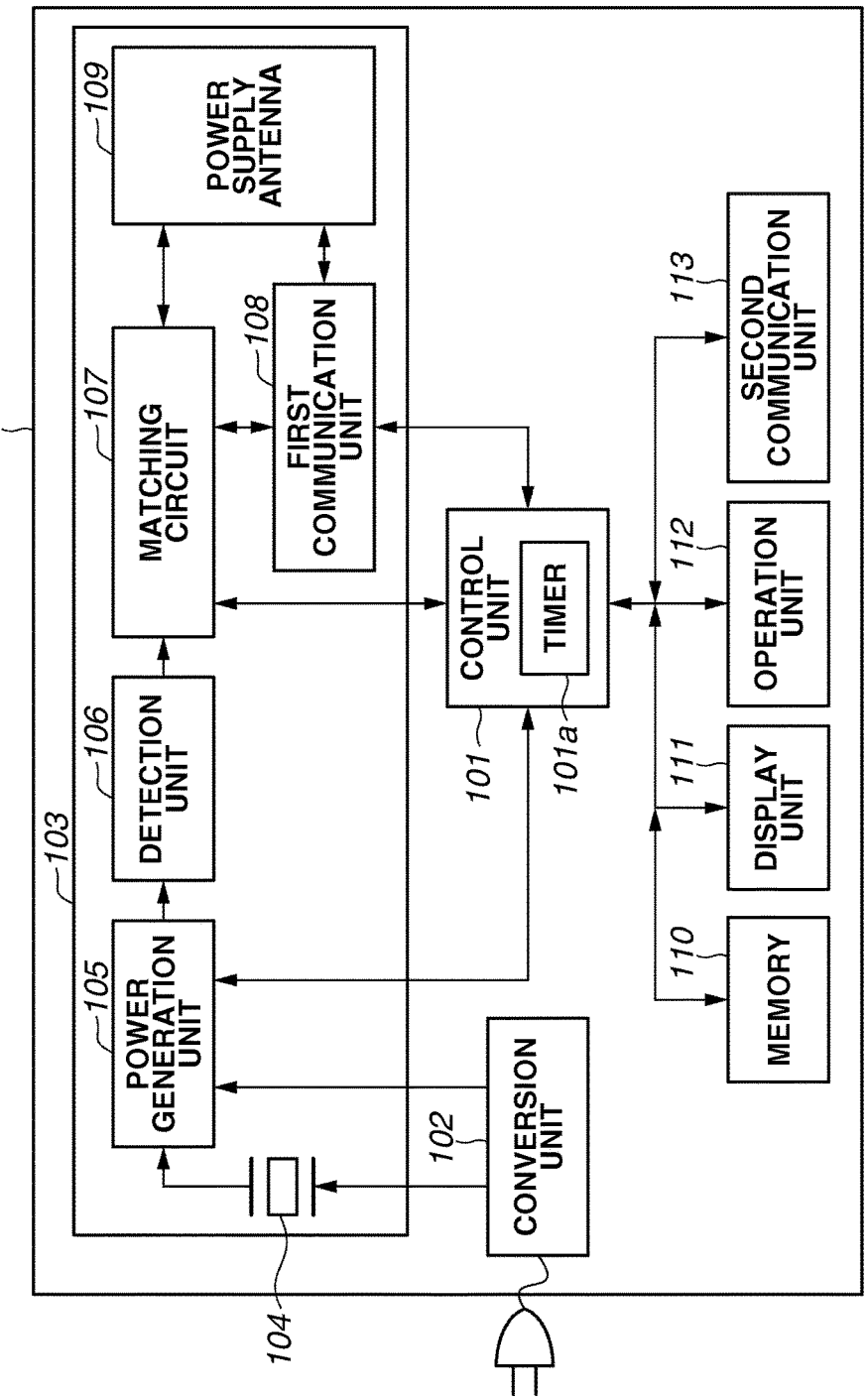
FIG. 2 is a block diagram illustrating an example of a power supply apparatus according to the first embodiment.

FIG. 2 is a block diagram illustrating an example of the power supply apparatus 100 according to the first embodiment. As illustrated in FIG. 2, the power supply apparatus 100 includes a control unit 101, a conversion unit 102, a power supply unit 103, an oscillator 104, a power generation unit 105, a detection unit 106, a matching circuit 107, a first communication unit 108, and a power supply antenna 109. The power supply apparatus 100 further includes a memory 110, a display unit 111, an operation unit 112, and a second communication unit 113.

The power supply unit 103 includes the oscillator 104, the power generation unit 105, the detection unit 106, the matching circuit 107, the first communication unit 108, and the power supply antenna 109. The power supply unit 103 is used for performing power supply based on a predetermined power supply method. The predetermined power supply method is, for example, a power supply method that uses a magnetic field resonance method. The magnetic field resonance method is for transmitting power from the power supply apparatus 100 to the electronic device 200 in a state of performing resonance between the power supply apparatus 100 and the electronic device 200. The status of performing resonance between the power supply apparatus 100 and the electronic device 200 is a status of matching a resonance frequency of a power reception antenna 203 of the electronic device 200 with a resonance frequency of the power supply antenna 109 of the power supply apparatus 100.

The control unit 101 controls the power supply apparatus 100 by executing a computer program recorded in the memory 110. The control unit 101 includes, for example, a Central Processing Unit (CPU) or a Micro Processing Unit (MPU). The control unit 101 is configured of hardware. The control unit 101 includes a timer 101a.

When the power supply apparatus 100 is connected to a Alternating Current (AC) power source (not illustrated), the conversion unit 102 converts AC power supplied from AC power source (not illustrated) into Direct Current (DC) power, and supplies the converted DC power to the power supply apparatus 100. The DC power is supplied from the conversion unit 102 to the power supply unit 103.

The oscillator 104 oscillates in a frequency used for controlling the power generation unit 105.

The power generation unit 105 generates power to be supplied to the outside via the power supply antenna 109 based on the power supplied from the conversion unit 102 and the frequency signal oscillated by the oscillator 104. The power generated by the power generation unit 105 includes first power and second power. The power generated by the power generation unit 105 is supplied to the power supply antenna 109 via the detection unit 106 and the matching circuit 107.

The first power is used for, for example, performing wireless communication based on a first communication standard. The first communication standard is, for example, a Near Field Communication (NFC) standard defined at the NFC Forum. The first communication standard may be, for example, ISO/IEC 18092 Standard, ISO/IEC 1443 Standard, or ISO/IEC 2148 Standard. The first power is, for example, power of 1 W or lower. The first power is not limited to the power of 1 W or lower as long as it is used for performing wireless communication based on the NFC standard. The first power may be power defined in the NFC standard.

The second power is used for causing the electronic device 200 to perform charging or a predetermined operation. When the second power is output via the power supply antenna 109, the power supply apparatus 100 does not perform wireless communication based on the NFC standard via the power supply antenna 109. The second power is, for example, power of 2 W or higher. The second power is not limited to the power of 2 W or higher as long as it is higher than the first power. The second power may be power defined in the NFC standard.

The detection unit 106 detects whether the electronic device 200 is present near the power supply apparatus 100 by using Voltage Standing Wave Ratio (VSWR). The VSWR is a value indicating a relationship between a traveling wave of the power output from the power supply antenna 109 and a reflected wave of the power output from the power supply antenna 109. The detection unit 106 can detect whether the electronic device 200 is present near the power supply apparatus 100 according to the VSWR.

The matching circuit 107 is a resonance circuit for performing resonance between the power supply antenna 109 and the power reception antenna 203 of the electronic device 200. The matching circuit 107 sets a resonance frequency of the power supply antenna 109. The matching circuit 107 includes a circuit for performing impedance matching between the power generation unit 105 and the power supply antenna 109.

When the power supply apparatus 100 outputs the first power via the power supply antenna 109, the control unit 101 controls the matching circuit 107 to match the resonance frequency of the power supply antenna 109 with a first frequency. The first frequency is, for example, 13.56 MHz. The first frequency may be a frequency defined in the NFC standard.

When the power supply apparatus 100 outputs the second power via the power supply antenna 109, the control unit 101 controls the matching circuit 107 to match the resonance frequency of the power supply antenna 109 with the second frequency. In the first embodiment, the first frequency and the second frequency are equal frequencies.

The first communication unit 108 performs wireless communication based on the NFC standard. The first communication unit 108 operates in a reader/writer mode defined in the NFC standard. The first communication unit 108 transmits a predetermined command for controlling wireless power supply to the electronic device 200.

When the power supply apparatus 100 transmits the predetermined command to the electronic device 200 via the power supply antenna 109, the first communication unit 108 superimposes the predetermined command on the first power to transmit it to the electronic device 200. The first communication unit 108 superimposes the predetermined command on the first power by performing Amplitude Shift Keying (ASK) modulation.

After reception of the predetermined command from the power supply apparatus 100, the electronic device 200 transmits response data corresponding to the predetermined command to the power supply apparatus 100. In this case, the electronic device 200 performs load modulation to transmit the response data corresponding to the predetermined command to the power supply apparatus 100. When the electronic device 200 performs load modulation, current flowing through the power supply antenna 109 changes. Thus, the first communication unit 108 receives the response data corresponding to the predetermined command from the electronic device 100 by detecting the current of the power supply antenna 109.

The predetermined command is data used for accessing a predetermined table 500 stored beforehand in the electronic device 200. The predetermined table is a table recording data used for performing wireless power supply and an address associated with the data.

Next, the predetermined command will be described referring to FIGS. 3A and 3B.

The predetermined command includes one of a first command and a second command. The first command is data for reading the data stored in the predetermined table 500. The second command is data for rewriting the data stored in the predetermined table 500.

Figure 3A:
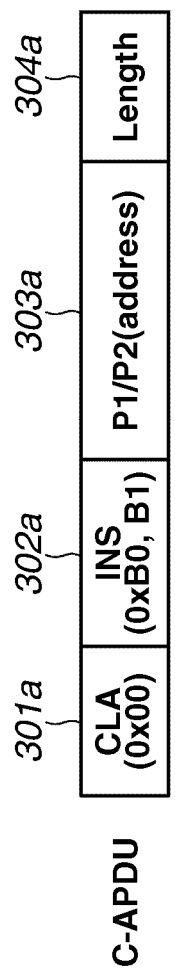
FIG. 3A is a diagram illustrating an example of a configuration of a first command according to the first embodiment.
Figure 3B:
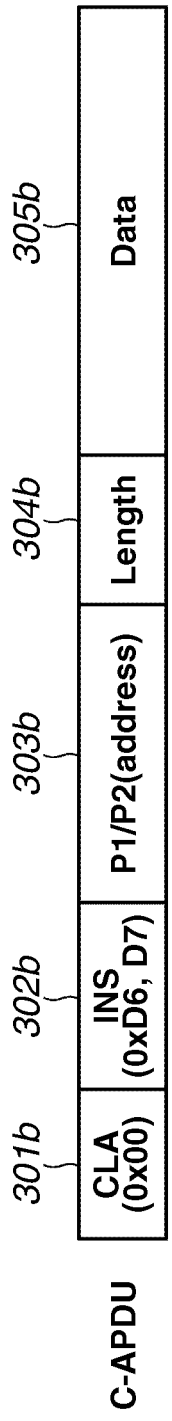
FIG. 3B is a diagram illustrating an example of a configuration of a second command according to the first embodiment.

FIG. 3A illustrates a structure of the first command, and FIG. 3B illustrates a structure of the second command.

Hereinafter, referring to FIG. 3A, the first command will be described. The first command is data defined by NFC Data Exchange Format (NDEF). As illustrated in FIG. 3A, the first command includes a Command Application Protocol Data Unit (C-APDU) defined in the NFC standard. Class Byte 301a (CLA) of the first command includes "00h" as a fixed value. Further, Instruction Byte (INS) 302a of the first command includes one of "B0h" and "B1h". The "B0h" and the "B1h" are information indicating data used by the first command to read the data stored in the predetermined table 500 from the predetermined table 500. Param [1/2] 303a of the first command includes an "address value". The "address value" is information indicating an address corresponding to data read from the predetermined table 500 by the power supply apparatus 100. Length 304a of the first command includes a "data length". The "data length" is information indicating a length of the data read from the predetermined table 500 by the power supply apparatus 100. The first command may also be referred to as a "Read command of C-APUD".

Hereinafter, referring to FIG. 3B, the second command will be described.

The second command is data defined at NDEF of the NFC standard. As illustrated in FIG. 3B, the second command includes a C-APDU defined in the NFC standard. CLA 301b of the second command includes "00h" as a fixed value. Further, INS 302b of the second command includes one of "D6h" and "D7h". The "D60h" and the "D7h" are information indicating data used by the second command to rewrite the data stored in the predetermined table 500. Param [1/2] 303b of the second command includes an "address value". The "address value" is information indicating an address corresponding to data to be written in the predetermined table 500 by the power supply apparatus 100. Length 304b of the second command includes a "data length". Data 305b of the second command includes data to be written in the predetermined table 500 by the power supply apparatus 100. The "data length" is information indicating a length of the data included in the Data 305b. The second command can also be referred to as an "Update command of C-APUD".

The power supply antenna 109 is an antenna for outputting one of the first power and the second power to the electronic device 200. The power supply antenna 109 is used by the first communication unit 108 to perform wireless communication with the electronic device 200 using the NFC standard.

The memory 110 records a computer program for controlling the power supply apparatus 100 and parameters relating to the power supply apparatus 100. The memory 110 records data received from the electronic device 200.

The display unit 111 displays video data supplied from the memory 110.

The operation unit 112 provides a user interface for operating the power supply apparatus 100. The operation unit 112 includes buttons, switches, or a touch panel for operating the power supply apparatus 100. The control unit 101 controls the power supply apparatus 100 according to an input signal input via the operation unit 112.

The second communication unit 113 performs wireless communication with the electronic device 200 based on a second communication standard. The second communication standard is, for example, a Wireless Local Area Network (LAN) standard. The second communication unit 113 receives data including at least one of video data, audio data, and a command from the electronic device 200 according to the wireless LAN standard. The second communication unit 113 transmits data including at least one of video data, audio data, and a command to the electronic device 200 according to the wireless LAN standard.

Figure 4:
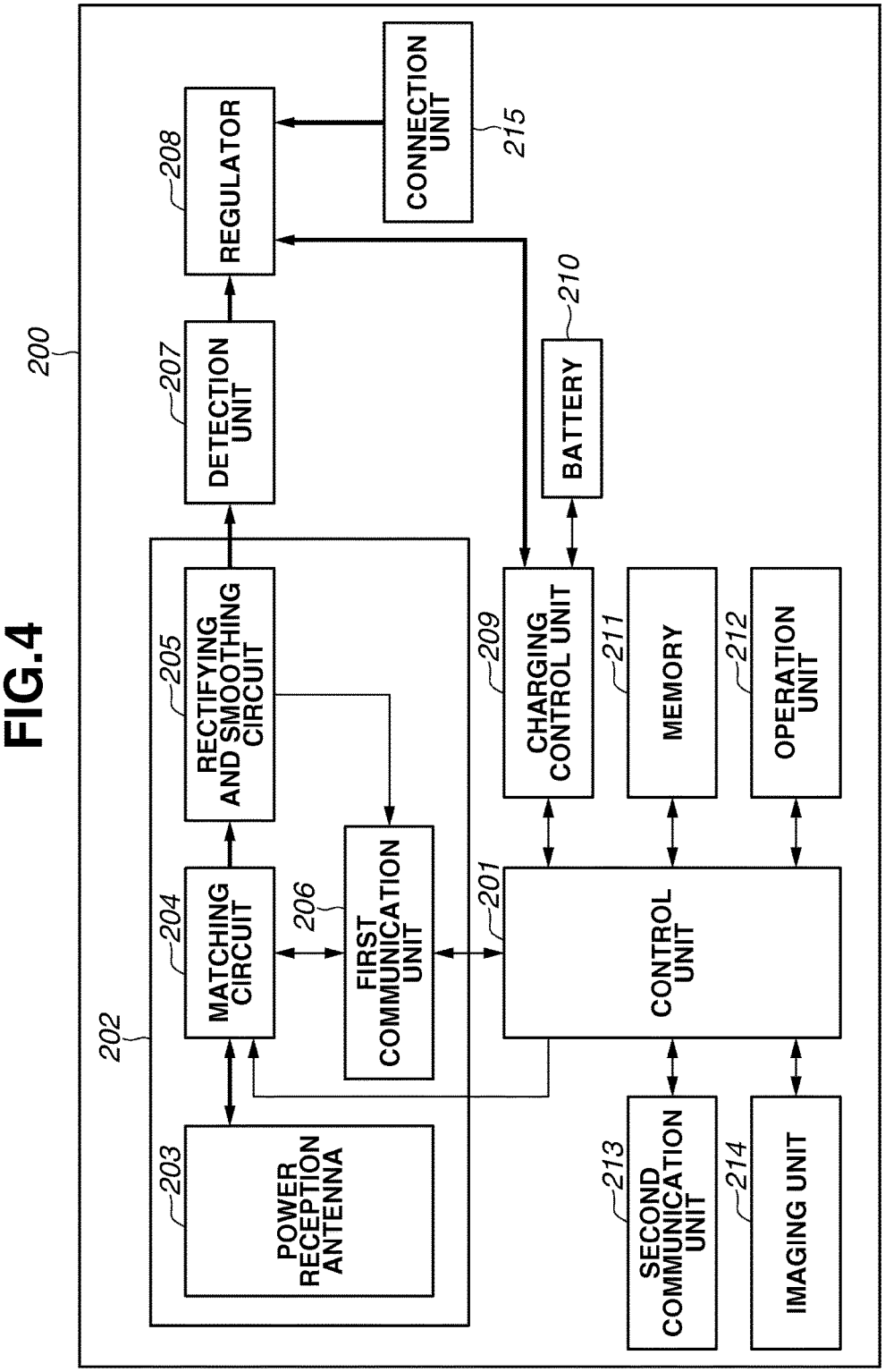
FIG. 4 is a block diagram illustrating an example of an electronic device according to the first embodiment.

Next, referring to FIG. 4, an example of a configuration of the electronic device 200 according to the first embodiment will be described. The electronic device 200 includes a control unit 201, a power reception unit 202, a power reception antenna 203, a matching circuit 204, a rectifying and smoothing circuit 205, and a first communication unit 206. The electronic device 200 further includes a detection unit 207, a regulator 208, a charging control unit 209, a battery 210, a memory 211, an operation unit 212, a second communication unit 213, an imaging unit 214, a connection unit 215, and an internal bus interface 216.

The control unit 201 controls the electronic device 200 by executing a computer program recorded in the memory 211. The control unit 201 includes, for example, a CPU or a MPU. The control unit 201 is configured of hardware. The control unit 201 includes a timer 201a (not illustrated).

The memory 211 stores a predetermined table 500. Referring to FIG. 5, the predetermined table 500 will be described. FIG. 5 is a diagram illustrating a configuration of the predetermined table 500. The control unit 201 can read data from the predetermined table 500 via the internal bus interface 216, or write data in the predetermined table 500 via the internal bus interface 216. The regulator 208 can read data from the predetermined table 500 via the internal bus interface 216, or write data in the predetermined table 500 via the internal bus interface 216. The charging control unit 209 can read data from the predetermined table 500 via the internal bus interface 216, or write data in the predetermined table 500 via the internal bus interface 216. The detection unit 207 can read data from the predetermined table 500 via the internal bus interface 216, or write data in the predetermined table 500 via the internal bus interface 216. The first communication unit 206 can read data from the predetermined table 500 via the internal bus interface 216, or write data in the predetermined table 500 via the internal bus interface 216.

The predetermined data 500 complies with Type 4 defined in the NFC Forum standard. The predetermined data 500 complies with to Recorded Type Definition (RTD) of wireless power supply defined in the NFC standard. The predetermined data 500 includes header data 501, a first address 502, a second address 503, and a third address 504. An initial address 505 of the predetermined table 500 is started from E104h.

The predetermined data 500 includes the header data 501 indicating compliance to wireless power supply. Data indicating a wireless power supply method that can deal with the electronic device 200 is stored in a Type field of the header data 501. For example, data indicating a wireless power supply method defined in the NFC standard is stored in the Type field of the header data 501. Data indicating a data size from the head address 505 to a last address 506 of the RTD of the wireless power supply is stored in a Payload Length field of the header data 501. The power supply apparatus 100, the control unit 201, the first communication unit 206, the detection unit 207, the regulator 208, and the charging control unit 209 cannot rewrite the header data 501.

In the predetermined table 500, the first address 502 and first version data indicating a communication protocol of the wireless power supply of the electronic device are stored in association with each other. In the predetermined table 500, the first address 502 and identification data of the electronic device 200 are stored in association with each other. In the predetermined table 500, the first address 502 and power reception capability data are stored in association with each other. Further, in the predetermined table 500, the first address 502 and reference data are stored in association with each other.

The identification data of the electronic device 200 is data for identifying the electronic device 200. The identification data of the electronic device 200 includes, for example, data indicating a product name of the electronic device 200, data indicating a manufacturer's name of the electronic device 200, and data indicating a serial number of the electronic device 200. The identification data of the electronic device 200 may include data corresponding to TextRTD defined in the NFC Forum standard.

The power reception capability data of the electronic device 200 is data indicating power reception capability of the electronic device 200. The power reception capability data of the electronic device 200 includes data indicating a value of power receivable by the electronic device 200 via the power reception antenna 203 or data indicating power used for performing communication according to the NFC standard.

The reference data includes URI information indicating a reference destination of data regarding the electronic device 200. The reference data may include data according to URI RTD defined in the NFC Forum standard.

It is presumed that the data corresponding to the first address 502 cannot be rewritten by the power supply apparatus 100, the control unit 201, the first communication unit 206, the detection unit 207, the regulator 208, and the charging control unit 209. The power supply apparatus 100 can read the data corresponding to the first address 502 from the predetermined table 500 by transmitting the first command including the first address 502 to the electronic device 200.

In the predetermined table 500, the second address 503 and status data of the electronic device 200 are stored in association with each other. The status data of the electronic device 200 is data indicating a status of the electronic device 200. The status data of the electronic device 200 includes at least one of data detected by the control unit 201, data detected by the charging control unit 209, data detected by the detection unit 207, and data detected by the regulator 208.

The status data includes, for example, data indicating a temperature of the electronic device 200 and data indicating a communication status of the second communication unit 213. The data indicating the temperature of the electronic device 200 is periodically detected by the control unit 201. The data indicating the communication status of the second communication unit 213 is periodically detected by the control unit 201.

For example, the status data includes data indicating power received from the power supply apparatus 100 by the electronic device 200, data indicating power consumption of the electronic device 200, data indicating an operation of the electronic device 200, and data indicating a surplus or a shortage of power of the electronic device 200. The data indicating the power received from the power supply apparatus 100 by the electronic device 200 is periodically detected by the detection unit 207. The data indicating the power consumption of the electronic device 200, the data indicating the operation of the electronic device 200, and the data indicating the surplus or a shortage of power of the electronic device 200 are periodically detected by the control unit 201 or the regulator 208.

For example, the status data includes data indicating whether power has been supplied to the electronic device 200 from an external power source device, data indicating a status of the battery 210, and data relating to charging of the battery 210. The data indicating whether power has been supplied to the electronic device 200 from the external power source device is periodically detected by the control unit 201 or the regulator 208. The data indicating the status of the battery 210 and the data relating to charging of the battery 210 are periodically detected by the charging control unit 209.

It is presumed that the data corresponding to the second address 503 cannot be rewritten by the power supply apparatus 100. The data corresponding to the second address 503 can be rewritten by at least one of the control unit 201, the first communication unit 206, the detection unit 207, the regulator 208, and the charging control unit 209.

The power supply apparatus 100 can read the data corresponding to the second address 503 from the predetermined table 500 by transmitting a first command including the second address to the electronic device 200. The data corresponding to the second address 503 is read by at least one of the control unit 201, the first communication unit 206, the detection unit 207, the regulator 208, and the charging control unit 209. The control unit 201 can control the electronic device 200 by using the data corresponding to the second address 503.

In the predetermined table 500, the third address 504 and second version data indicating a version of a communication protocol for wireless power supply by the power supply apparatus 100 are stored in association with each other. Further, in the predetermined table 500, the third address 504 and power supply data of the electronic device 200 are stored in association with each other. The power supply data of the electronic device 200 is data indicating a power supply status to the electronic device 200. The power supply data of the electronic device 200 includes data included in Data 305b of the second command received from the power supply apparatus 100 by the first communication unit 206. The power supply data of the electronic device 200 includes, for example, version data indicating a version of a communication protocol for wireless power supply by the power supply apparatus 100, and data indicating a start or a stop of power supply. The power supply data of the electronic device 200 includes data indicating time of outputting second power, and data indicating time of outputting first power. The power supply data of the electronic device 200 includes data indicating a reason for a stop of wireless power supply. The power supply data of the electronic device 200 may include data indicating a value of the second power or the first power.

It is presumed that the data corresponding to the third address 504 cannot be rewritten by the control unit 201, the first communication unit 206, the detection unit 207, the regulator 208, and the charging control unit 209. The data corresponding to the third address 504 can be read or rewritten by the power supply apparatus 100.

The power supply apparatus 100 can read the data corresponding to the third address 504 from the predetermined table 500 by transmitting a first command including the third address 504 to the electronic device 200. The power supply apparatus 100 can rewrite the data corresponding to the third address 504 from the predetermined table 500 by transmitting a second command including the third address 504 to the electronic device 200.

The data corresponding to the third address 504 is read by at least one of the control unit 201, the first communication unit 206, the detection unit 207, the regulator 208, and the charging control unit 209. The control unit 201 can control the electronic device 200 by using the data corresponding to the third address 504. When an error occurs in the electronic device 200, at least one of the control unit 201, the first communication unit 206, the detection unit 207, the regulator 208, and the charging control unit 209 writes data relating to the power supply error as power supply data in the predetermined table 500.

The power reception unit 202 includes the power reception antenna 203, the matching circuit 204, the rectifying and smoothing circuit 205, and the first communication unit 206. The power reception unit 202 complies with a power supply method of the power supply apparatus 100. Thus, the power reception unit 202 is used for receiving power based on the power supply method of the power supply apparatus 100.

The power reception antenna 203 is an antenna for receiving one of the first power and the second power from the power supply apparatus 100. The power reception antenna 203 is used for performing wireless communication with the power supply apparatus 100 based on the NFC standard.

The matching circuit 204 is a resonance circuit for performing resonance between the power reception antenna 203 and the power supply antenna 109 of the power supply apparatus 100. The matching circuit 204 sets a resonance frequency of the power reception antenna 203. When the electronic device 200 receives the first power from the power supply apparatus 100 via the power reception antenna 203, the control unit 201 controls the matching circuit 204 to match the resonance frequency of the power reception antenna 203 with a first frequency. When the electronic device 200 receives the second power from the power supply apparatus 100 via the power reception antenna 203, the control unit 201 controls the matching circuit 204 to match the resonance frequency of the power reception antenna 203 with the second frequency. The power received via the power reception antenna 203 is supplied to the rectifying and smoothing circuit 205 via the matching circuit 204.

The rectifying and smoothing circuit 205 removes a command from the power supplied from the matching circuit 204 to generate DC power. Further, the rectifying and smoothing circuit 205 supplies the generated DC power to the regulator 208 via the detection unit 207. The rectifying and smoothing circuit 205 supplies the command removed from the power received by the power reception antenna 203 to the first communication unit 206.

The first communication unit 206 performs wireless communication with the power supply apparatus 100 based on the NFC standard. When a predetermined command is received from the power supply apparatus 100 via the power reception antenna 203, the first communication unit 206 performs load modulation to transmit response data corresponding to the predetermined command. The control unit 201 controls an operation of the electronic device 200 according to the predetermined command received from the power supply apparatus 100 by the first communication unit 206.

When the first communication unit 206 receives the first command from the power supply apparatus 100, the first communication unit 206 transmits first response data corresponding to the first command to the power supply apparatus 100. When the first communication unit 206 receives the second command from the power supply apparatus 100, the first communication unit 206 transmits second response data corresponding to the second command to the power supply apparatus 100.

Next, referring to FIGS. 6A and 6B, the first response data and the second response data will be described.

Figure 6A:
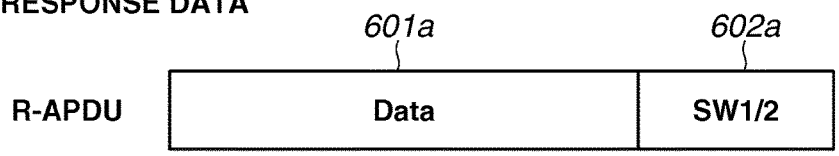
FIG. 6A is a diagram illustrating an example of a configuration of first response data according to the first embodiment.
Figure 6B:
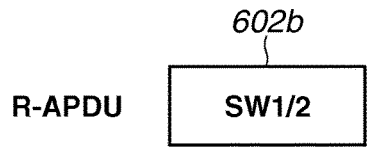
FIG. 6B is a diagram illustrating an example of a configuration of second response data according to the first embodiment.

FIG. 6A illustrates a structure of the first response data, and FIG. 6B illustrates a structure of the second response data.

Hereinafter, the first response data will be described referring to FIG. 6A. The first response data is data defined in the NDEF of the NFC standard. As illustrated in FIG. 6A, the first response data includes a Resource Application Protocol Data Unit (R-APDU) defined in the NFC standard. Data 601a of the first response data includes data read from the predetermined table 500. The data included in the Data 601a of the first response data is data corresponding to an "address value" included in Param [1/2] 303a of the first command. SW [1/2] 602a (Status Word) of the first response data includes data indicating whether reading of data defined in the first command has been normally ended.

When the address value included in the first command corresponds to the first address 502, the Data 601a of the first response data includes first version data and identification data of the electronic device 200. When the address value included in the first command corresponds to the second address 503, the Data 601a of the first response data includes status data of the electronic device 200. When the address value included in the first command corresponds to the third address 504, the Data 601a of the first response data includes power supply data of the electronic device 200.

Hereinafter, the second response data will be described referring to FIG. 6B. The second response data is data defined in the NDEF of the NFC standard. As illustrated in FIG. 6B, the second response data includes R-APDU defined in the NFC standard. SW [1/2] 602b of the second response data includes data indicating whether writing of data defined in the second command has been normally ended.

When an address value included in the second command corresponds to the third address 504, data included in Data 305b of the second command is written in the predetermined table 500, and then the first communication unit 206 transmits the second response data to the power supply apparatus 100.

The detection unit 207 periodically detects the power received from the power supply apparatus 100 by the electronic device 200 based on the value of the power supplied from the rectifying and smoothing circuit 205.

The regulator 208 performs control to supply the power supplied from one of the rectifying and smoothing circuit 205 and the battery 210 to the electronic device 200. The regulator 208 supplies the power supplied from the rectifying and smoothing circuit 205 to the electronic device 200 according to an instruction from the control unit 201. The regulator 208 supplies the discharge power supplied from the battery 201 via the charging control unit 209 to the electronic device 200 according to an instruction from the control unit 201.

The charging control unit 209 performs charging of the battery 210 by using the power supplied from the regulator 208. When the power is discharged from the battery 210, the charging control unit 209 supplies the discharge power supplied from the battery 210 to the regulator 208. The charging control unit 209 periodically detects data regarding a status of the battery 210 and data regarding charging of the battery 210.

The battery 210 is attachable to and detachable from the electronic device 200. The battery 210 is a chargeable secondary battery, for example, a lithium ion battery. The battery 210 may be other than the lithium ion battery.

The memory 211 stores a computer program for controlling the electronic device 200. In the memory 211, information regarding the electronic device 200 or data received from the power supply apparatus 100 is recorded. The memory 211 may be a Flash Read-Only Memory (Flash ROM), an Electrically Erasable Programmable ROM (EEPROM), or a Fe Random Access Memory (FeRAM).

The operation unit 212 provides a user interface for operating the electronic device 200. The operation unit 212 includes buttons, switches, or a touch panel for operating the electronic device 200. The control unit 201 controls the electronic device 200 according to an input signal input via the operation unit 212.

The second communication unit 213 performs wireless communication with the power supply apparatus 100 according to the wireless LAN standard. The second communication unit 213 receives data including at least one of video data, audio data, and a command from the power supply apparatus 100 according to the wireless LAN standard. The second communication unit 213 transmits data including at least one of video data, audio data, and a command to the power supply apparatus 100 according to the wireless LAN standard.

The imaging unit 214 includes a circuit for generating image data including at least one of still image data and moving image data. The imaging unit 214 performs imaging according to an instruction received via the operation unit 212.

The connection unit 215 includes a connector for connecting the external power source device and the electronic device 200. The external power source device is, for example, an AC adaptor. The external power source device may be a device for supplying power to the electronic device 200 according to the Universal Serial Bus (USB) standard or the Ethernet (registered trademark) standard.

The power supply apparatus 100 is configured to supply power to the electronic device 200 by wireless. However, "wireless" may be referred to as "noncontact" or "contactless".

(Control Process)

Next, referring to a flowchart illustrated in FIG. 7, a control process performed by the power supply apparatus 100 according to the first embodiment will be described. A power supply process can be realized by the control unit 101 executing the computer program stored in the memory 110.

When power of the power supply apparatus 100 is turned ON, the control unit 101 executes the process in step S701.

In step S701, the control unit 101 performs a first authentication process. The first authentication process is a process for detecting whether the electric device 200 is a device complying with wireless power supply. The first authentication process will be described below. After the first authentication process has been executed, in the flowchart, the process proceeds from step S701 to step S702.

After the first authentication process has been executed, a first flag is set. The first flag is information stored in the memory 110. The first flag indicates whether the electronic device 200 is a device complying with wireless power supply. When it is detected that the electronic device 200 is a device complying with the wireless power supply, the control unit 101 sets the first flag to ON. When it is detected that the electronic device 200 is not a device complying with the wireless power supply, the control unit 101 sets the first flag to OFF.

In step S702, the control unit 101 determines, based on the first flag, whether the electronic device 200 present within a predetermined range is a device complying with the wireless power supply. When the first flag is ON, the control unit 101 determines that the electronic device 200 is a device complying with the wireless power supply. When the control unit 101 determines that the electronic device 200 is a device complying with the wireless power supply (YES in step S702), in the flowchart, the process proceeds from step S702 to step S703. When the first flag is OFF, the control unit 101 determines that the electronic device 200 is not a device complying with the wireless power supply. When the control unit 101 determines that the electronic device 200 is not a device complying with the wireless power supply (NO in step S702), in the flowchart, the process ends. When the control unit 101 determines that the electronic device 200 is not a device complying with the wireless power supply (NO in step S702), if power is output from the power supply antenna 109, the control unit 101 controls the power supply unit 103 not to output power from the power supply antenna 109.

In step S703, the control unit 101 performs a second authentication process. The second authentication process is a process for detecting whether the power supply apparatus 100 can start a power supply process to the electric device 200. After the second authentication process has been executed, in the flowchart, the process proceeds from step S703 to step S704.

After the second authentication process has been executed, a second flag is set. The second flag is information stored in the memory 110. The second flag indicates whether the power supply apparatus 100 can start a power supply process to the electric device 200. When it is detected that the power supply apparatus 100 can start a power supply process to the electric device 200, the control unit 101 sets the second flag to ON. When it is detected that the power supply apparatus 100 cannot start a power supply process to the electric device 200, the control unit 101 sets the second flag to OFF.

In step S704, the control unit 101 determines, according to the second flag, whether to perform a power supply process to the electronic device 200.

When the second flag is ON, the control unit 101 determines to perform a power supply process to the electronic device 200 (YES in step S704). In this case (YES in step S704), in the flowchart, the process proceeds from step S704 to step S705. When the second flag is OFF, the control unit 101 determines not to perform a power supply process to the electronic device 200. In this case (NO in step S704), the flowchart is ended. When the control unit 101 determines not to perform a power supply process to the electronic device 200 (NO in step S704), if power is output from the power supply antenna 109, the control unit 101 controls the power supply unit 103 not to output power from the power supply antenna 109.

In step S705, the control unit 101 performs a power supply process. The power supply process will be described below. When the power supply process is performed, the flowchart is ended.

(First Authentication Process)

Next, referring to a flowchart illustrated in FIG. 8, the first authentication process performed by the power supply apparatus 100 in step S701 illustrated in FIG. 7 will be descried.

The first authentication process can be realized by the control unit 101 executing the computer program stored in the memory 110.

In step S801, the control unit 101 controls the matching circuit 107 so that a resonance frequency of the power supply antenna 109 is equal to the first frequency. Further, in this case, the control unit 101 controls the power supply unit 103 to output first power via the power supply antenna 109. In this case, in the flowchart, the process proceeds from step S801 to step S802. After step S801, when the detection unit 106 detects presence of an object near the power supply apparatus 100, the control unit 101 executes step S802.

In step S802, the control unit 101 performs authentication defined in the NFC standard. The authentication performed in step S802 is, for example, authentication defined in ISO 14443-3 or NFC Digital Protocol. In this case, in the flowchart, the process proceeds from step S802 to step S803.

In step S803, the control unit 101 determines whether the electronic device 200 is present within a predetermined range based on a result of the process in step S802. When the control unit 101 determines that the electronic device 200 is present within the predetermined range (YES in step S803), in the flowchart, the process proceeds from step S803 to step S804. When the control unit 101 determines that the electronic device 200 is not present within the predetermined range (NO in step S803), in the flowchart, the process returns from step S803 to step S801.

In step S804, the control unit 101 determines, according to the result of process in step S802, that the electronic device 200 is a card of Type 4 of the NFC Forum or a tag of Type 4 of the NFC Forum. Then, the control unit 101 controls the first communication unit 108 to perform authentication corresponding to the card of Type 4 of the NFC Forum or the tag of Type 4 of the NFC Forum. In this case, in the flowchart, the process proceeds from step S804 to step S805.

In step S805, the control unit 101 controls the first communication unit 108 to transmit a Select command defined in Type 4 of the NFC Forum. The Select command is a command for accessing the predetermined table 500 of the electronic device 200 by the power supply apparatus 100. After the Select command has been transmitted, in the flowchart, the process proceeds from step S805 to step S806.

In step S806, the control unit 101 determines whether the first communication unit 108 has received response data corresponding to the Select command from the electronic device 200.

When it is determined that the first communication unit 108 has received the response data corresponding to the Select command (YES in step S806), in the flowchart, the process proceeds from step S806 to step S807. When it is determined that the first communication unit 108 has not received any response data corresponding to the Select command (NO in step S806), in the flowchart, the process proceeds from step S806 to step S814. Even when the first communication unit 108 has received the response data in response to the Select command, if the response data in response to the Select command includes abnormal data, in the flowchart, the process proceeds from step S806 to step S814.

In step S807, the control unit 101 controls the first communication unit 108 to transmit a first command to read the header data 501 from the predetermined table 500. Then, when the first communication unit 108 receives first response data, in the flowchart, the process proceeds from step S807 to step S808.

In step S808, the control unit 101 determines whether the electronic device 200 complies with the wireless power supply by using the first response data received by the first communication unit 108 in step S807. When it is determined that the header data 501 is included in the first response data received by the first communication unit 108, the control unit 101 determines that the electronic device 200 complies with the wireless power supply (YES in step S808). In this case, (YES in step S808), in the flowchart, the process proceeds from step S808 to step S809. When it is determined that the header data 501 is not included in the first response data received by the first communication unit 108, the control unit 101 determines that the electronic device 200 does not comply with the wireless power supply (NO in step S808). In this case, (NO in step S808), in the flowchart, the process proceeds from step S808 to step S814.

In step S809, the control unit 101 controls the first communication unit 108 to transmit a first command including the first address 502 to the electronic device 200 to read first version data of the electronic device 200 from the predetermined table 500. In this case, in the flowchart, the process proceeds from step S809 to step S810.

In step S810, the control unit 101 determines whether the first communication unit 108 has received the first version data. When it is determined that the first communication unit 108 has received the first version data (YES in step S810), the control unit 101 records the first version data of the electronic device 200 in the memory 110. When it is determined that the first communication unit 108 has received the first version data (YES in step S810), in the flowchart, the process proceeds from step S810 to step S811.

When it is determined that the first communication unit 108 has not received the first version data (NO in step S810), in the flowchart, the process proceeds from step S810 to step S814.

In step S811, the control unit 101 controls the first communication unit 108 to transmit a second command including the third address 504 to the electronic device 200 to write second version data in the predetermined table 500. In this case, in the flowchart, the process proceeds from step S811 to step S812.

In step S812, the control unit 101 determines whether the writing of the second version data has been completed. In this case, the control unit 101 determines whether the first communication unit 108 has received second response data indicating completion of the writing of the second version data.

When it is determined that the first communication unit 108 has received the second response data indicating completion of the writing of the second version data, the control unit 101 determines that the writing of the second version data has been completed (YES in step S812). In this case (YES in step S812), in the flowchart, the process proceeds from step S812 to step S813. When it is determined that the first communication unit 108 has not received any second response data indicating completion of the writing of the second version data, the control unit 101 determines that the writing of the second version data has not been completed (NO in step S812). In this case (NO in step S812), in the flowchart, the process proceeds from step S812 to step S814.

In step S813, the control unit 101 sets the first flag to ON. In this case, the flowchart is ended, and the process proceeds to step S702 illustrated in FIG. 7.

In step S814, the control unit 101 sets the first flag to OFF. In this case, the flowchart is ended, and the process proceeds to step S702 illustrated in FIG. 7.

(Second Authentication Process)

Next, referring to a flowchart illustrated in FIG. 9, the second authentication process performed by the power supply apparatus 100 in step S703 illustrated in FIG. 7 will be descried. The second authentication process can be realized by the control unit 101 executing the computer program stored in the memory 110.

In step S901, the control unit 101 controls the first communication unit 108 to transmit a first command including the first address 502 to the electronic device 200 to read identification data of the electronic device 200 from the predetermined table 500. In this case, in the flowchart, the process proceeds from step S901 to step S902.

In step S902, the control unit 101 determines whether the first communication unit 108 has received the identification data of the electronic device 200. When it is determined that the first communication unit 108 has received the identification data of the electronic device 200 (YES in step S902), the control unit 101 records the identification data of the electronic device 200 in the memory 110. When it is determined that the first communication unit 108 has received the identification data of the electronic device 200 (YES in step S902), in the flowchart, the process proceeds from step S902 to step S903. When it is determined that the first communication unit 108 has not received the identification data of the electronic device 200 (NO in step S902), in the flowchart, the process proceeds from step S902 to step S911.

In step S903, the control unit 101 controls the first communication unit 108 to transmit a first command including the first address 502 to the electronic device 200 to read power reception capability data of the electronic device 200 from the predetermined table 500. In this case, in the flowchart, the process proceeds from step S903 to step S904.

In step S904, the control unit 101 determines whether the first communication unit 108 has received the power reception capability data of the electronic device 200. When it is determined that the first communication unit 108 has received the power reception capability data of the electronic device 200 (YES in step S904), the control unit 101 records the power reception capability data of the electronic device 200 in the memory 110. When it is determined that the first communication unit 108 has received the power reception capability data of the electronic device 200 (YES in step S904), in the flowchart, the process proceeds from step S904 to step S905. When it is determined that the first communication unit 108 has not received the power reception capability data of the electronic device 200 (NO in step S904), in the flowchart, the process proceeds from step S904 to step S911.

In step S905, the control unit 101 controls the first communication unit 108 to transmit a first command including the first address 502 to the electronic device 200 to read reference data of the electronic device 200 from the predetermined table 500. In this case, in the flowchart, the process proceeds from step S905 to step S906.

In step S906, the control unit 101 determines whether the first communication unit 108 has received the reference data of the electronic device 200. When it is determined that the first communication unit 108 has received the reference data of the electronic device 200 (YES in step S906), the control unit 101 records the reference data of the electronic device 200 in the memory 110. When it is determined that the first communication unit 108 has received the reference data of the electronic device 200 (YES in step S906), in the flowchart, the process proceeds from step S906 to step S907. When it is determined that the first communication unit 108 has not received the reference data of the electronic device 200 (NO in step S906), in the flowchart, the process proceeds from step S906 to step S911.

In step S907, the control unit 101 controls the first communication unit 108 to transmit a first command including the second address 503 to the electronic device 200 to read status data of the electronic device 200 from the predetermined table 500. In this case, in the flowchart, the process proceeds from step S907 to step S908.

In step S908, the control unit 101 determines whether the first communication unit 108 has received the status data of the electronic device 200. When it is determined that the first communication unit 108 has received the status data of the electronic device 200 (YES in step S908), the control unit 101 records the status data of the electronic device 200 in the memory 110. When it is determined that the first communication unit 108 has received the status data of the electronic device 200 (YES in step S908), in the flowchart, the process proceeds from step S908 to step S909. When it is determined that the first communication unit 108 has not received the status data of the electronic device 200 (NO in step S908), in the flowchart, the process proceeds from step S908 to step S911.

In step S909, the control unit 101 determines whether the electronic device 200 is a power supply target. In this case, the control unit 101 determines whether the electronic device 200 is a power supply target by using the status data of the electronic device 200.

For example, when a temperature of the electronic device 200 is equal to or higher than a predetermined temperature, the control unit 101 determines that the electronic device 200 is not a power supply target. In this case, when the temperature of the electronic device 200 is not equal to or higher than the predetermined temperature, the control unit 101 determines that the electronic device 200 is a power supply target. The predetermined temperature is, for example, a temperature permitted for charging the battery 210.

For example, when the battery 210 is fully charged, the control unit 101 determines that the electronic device 200 is not a power supply target. In this case, when the battery 210 is not fully charged, the control unit 101 determines that the electronic device 200 is a power supply target.

For example, when an external power source device is connected to the electronic device 200, the control unit 101 determines that the electronic device 200 is not a power supply target. In this case, when no external power source device is connected to the electronic device 200, the control unit 101 determines that the electronic device 200 is a power supply target.

For example, when power supply is not requested from the electronic device 200, the control unit 101 determines that the electronic device 200 is not a power supply target. In this case, when power supply is requested from the electronic device 200, the control unit 101 determines that the electronic device 200 is a power supply target.

When it is determined that the electronic device 200 is a power supply target of the power supply apparatus 100 (YES in step S909), in the flowchart, the process proceeds from step S909 to step S910. When it is determined that the electronic device 200 is not a power supply target of the power supply apparatus 100 (NO in step S909), in the flowchart, the process proceeds from step S909 to step S911.

In step S910, the control unit 101 sets the second flag to ON. In this case, the flowchart is ended, and the process proceeds to step S704 illustrated in FIG. 7.

In step S911, the control unit 101 sets the second flag to OFF. In this case, the flowchart is ended, and the process proceeds to step S704 illustrated in FIG. 7.

(Power Supply Process)

Next, referring to a flowchart illustrated in FIG. 10, the power supply process performed by the power supply apparatus 100 in step S705 illustrated in FIG. 7 will be descried. The power supply process can be realized by the control unit 101 executing the computer program stored in the memory 110.

In step S1001, the control unit 101 controls the first communication unit 108 to transmit a second command including the third address 504 to the electronic device 200 to write power supply data in the predetermined table 500. In step S1001, the second command transmitted by the first communication unit 108 includes data indicating starting of power supply, data indicating time of outputting first power, and data indicating time of outputting second power. Further, the second command transmitted by the first communication unit 108 may include data indicating a value of the first power and data indicating a value of the second power. In this case, in the flowchart, the process proceeds from step S1001 to step S1002.

In step S1002, the control unit 101 determines whether the writing of the power supply data has been completed. When the first communication unit 108 has received second response data indicating completion of the writing of the power supply data, the control unit 101 determines that the writing of the power supply data has been completed (YES in step S1002). In this case (YES in step S1002), in the flowchart, the process proceeds from step S1002 to step S1003. When the first communication unit 108 has not received any second response data indicating completion of the writing of the power supply data, the control unit 101 determines that the writing of the second version data has not been completed (NO in step S1002). In this case (NO in step S1002), in the flowchart, the process proceeds from step S1002 to step S1013.

In step S1003, the control unit 101 controls the matching circuit 107 so that a resonance frequency of the power supply antenna 109 becomes equal to the second frequency. Further, in this case, the control unit 101 controls the power supply unit 103 to output the second power via the power supply antenna 109. The control unit sets a value of the second power according to status data acquired from the electronic device 200. In this case, in the flowchart, the process proceeds from step S1003 to step S1004.

In step S1004, the control unit 101 controls the timer 101a to measure time elapsed after the output of the second power. Then, the control unit 101 determines whether the time measured by the timer 101a is equal to or longer than a first time. When it is determined that the time measured by the timer 101a is equal to or longer than the first time (YES in step S1004), in the flowchart, the process proceeds from step S1004 to step S1005. When it is determined that the time measured by the timer 101a is not equal to or longer than the first time (NO in step S1004), in the flowchart, the process in step S1004 is repeated. The first time corresponds to the data indicating the time of outputting the second power included in the power supply data.

In step S1005, the control unit 101 controls the matching circuit 107 so that a resonance frequency of the power supply antenna 109 becomes equal to the first frequency. Further, in this case, the control unit 101 controls the power supply unit 103 so as to output first power via the power supply antenna 109. In this case, in the flowchart, the process proceeds from step S1005 to step S1006.

In step S1006, as in the case of step S907, the control unit 101 controls the first communication unit 108 to transmit a first command including the second address 503 to the electronic device 200 to read status data of the electronic device 200 from the predetermined table 500. In this case, in the flowchart, the process proceeds from step S1006 to step S1007.

In step S1007, as in the case of step S908, the control unit 101 determines whether the first communication unit 108 has received the status data of the electronic device 200. When it is determined that the first communication unit 108 has received the status data of the electronic device 200 (YES in step S1007), in the flowchart, the process proceeds from step S1007 to step S1008. When it is determined that the first communication unit 108 has not received the status data of the electronic device 200 (NO in step S1007), in the flowchart, the process proceeds from step S1007 to step S1013.

In step S1008, as in the case of step S909, the control unit 101 determines whether the electronic device 200 is a power supply target. When it is determined that the electronic device 200 is a power supply target of the power supply apparatus 100 (YES in step S1008), in the flowchart, the process proceeds from step S1008 to step S1009. When it is determined that the electronic device 200 is not a power supply target of the power supply apparatus 100 (NO in step S1008), in the flowchart, the process proceeds from step S1008 to step S1013.

In step S1009, the control unit 101 determines, based on the status data acquired from the electronic device 200, whether to change the value of the second power. The control unit 101 determines whether to change the value of the second power. When it is determined to change the value of the second power (YES in step S1009), in the flowchart, the process proceeds from step S1009 to step S1010. When it is determined not to change the value of the second power (NO in step S1009), in the flowchart, the process returns from step S1009 to step S1003.

In step S1010, the control unit 101 determines whether to perform changing to increase the second power. When it is determined that the control unit 101 performs changing to increase the value of the second power (YES in step S1010), in the flowchart, the process proceeds from step S1010 to step S1012. When it is determined that the control unit 101 does not perform changing to increase the value of the second power (NO in step S1010), in the flowchart, the process proceeds from step S1010 to step S1011.

In step S1011, the control unit 101 controls the matching circuit 107 so that a resonance frequency of the power supply antenna 109 becomes equal to the second frequency. Further, the control unit 101 controls the power supply unit 103 to reduce the value of the second power, and then controls the power supply unit 103 to output the second power. The control unit 101 may control the first communication unit 108 to transmit, before the second power is output, a second command including data indicating the changed value of the second power to the electronic device 200. In this case, in the flowchart, the process returns from step S1011 to step S1004.

In step S1012, the control unit 101 controls the matching circuit 107 so that a resonance frequency of the power supply antenna 109 becomes equal to the second frequency. Further, the control unit 101 controls the power supply unit 103 to increase the value of the second power, and then controls the power supply unit 103 to output the second power. The control unit 101 may control the first communication unit 108 to transmit, before the second power is output, a second command including data indicating the changed value of the second power to the electronic device 200. In this case, in the flowchart, the process returns from step S1012 to step S1004.

In step S1013, the control unit 101 sets the second flag to OFF. In this case, in the flowchart, the process proceeds from step S1013 to step S1014.

In step S1014, the control unit 101 controls the matching circuit 107 so that a resonance frequency of the power supply antenna 109 becomes equal to the first frequency. Further, in this case, the control unit 101 controls the power supply unit 103 to output the first power via the power supply antenna 109. In this case, in the flowchart, the process proceeds from step S1014 to step S1015.

In step S1015, the control unit 101 controls the first communication unit 108 to transmit a second command including the third address 504 to the electronic device 200 to write power supply data in the predetermined table 500. In step S1015, the second command transmitted by the first communication unit 108 includes data indicating stopping power supply and data indicating a reason for stopping the power supply. In this case, in the flowchart, the process proceeds from step S1015 to step S1016.

In step S1016, the control unit 101 performs control to limit the power output from the power supply antenna 109. In this case, the flowchart is ended, and the control process illustrated in FIG. 7 also is ended.

(Communication Process)

Next, referring to a flowchart illustrated in FIG. 11, a communication process performed by the electronic device 200 according to the first embodiment will be descried. The communication process can be realized by the control unit 201 executing a computer program stored in the memory 211.

In step S1101, the control unit 201 determines whether power detected by the detection unit 207 is equal to or higher than a predetermined value. When it is determined that the power detected by the detection unit 207 is equal to or higher than the predetermined value (YES in step S1101), in the flowchart, the process proceeds from step S1101 to step S1102. When it is determined that the power detected by the detection unit 207 is not equal to or higher than the predetermined value (NO in step S1101), in the flowchart, the process proceeds from step S1101 to step S1108.

In step S1102, the control unit 201 performs authentication defined in the NFC standard. The authentication performed in step S1102 is, for example, authentication defined in ISO 14443-3, ISO 14443-3, or NFC Digital Protocol. In this case, in the flowchart, the process proceeds from step S1102 to step S1103.

In step S1103, the control unit 201 controls the first communication unit 206 to transmit data indicating that the electronic device 200 is a card of Type 4 of the NFC Forum or a tag of Type 4 of the NFC Forum. In this case, in the flowchart, the process proceeds from step S1103 to step S1104.

In step S1104, the control unit 201 determines whether the first communication unit 206 has received a Select command defined in the Type 4 of the NFC Forum. When it is determined that the first communication unit 206 has received the Select command (YES in step S1104), the control unit 201 controls the first communication unit 206 to transmit response data corresponding to the Select Command to the power supply apparatus 100. In this case (YES in step S1104), in the flowchart, the process proceeds from step S1104 to step S1105. When it is determined that the first communication unit 206 has not received the Select command (NO in step S1104), in the flowchart, the process proceeds from step S1104 to step S1108.

In step S1105, the control unit 201 performs a process for resetting the data included in the predetermined table 500. For example, the control unit 201 resets the status data, the second version data, and the power supply data. In this case, in the flowchart, the process proceeds from step S1105 to step S1106.

In step S1106, the control unit 201 determines whether the first communication unit 206 has received at least one of the first command and the second command. When it is determined that the first communication unit 206 has received at least one of the first command and the second command (YES in step S1106), in the flowchart, the process proceeds from step S1106 to step S1109. When it is determined that the first communication unit 206 has received neither of the first command and the second command (NO in step S1106), in the flowchart, the process proceeds from step S1106 to step S1107.

In step S1107, the control unit 201 controls the timer 201a to measure time elapsed after the determination of the control unit 201 that the first communication unit 206 has received neither of the first command and the second command. Then, the control unit 201 determines whether the time measured by the timer 201a is equal to or longer than a second time. When it is determined that the time measured by the timer 201a is equal to or longer than the second time (YES in step S1107), in the flowchart, the process proceeds from step S1107 to step S1108. When it is determined that the time measured by the timer 201a is not equal to or longer than the second time (NO in step S1107), in the flowchart, the process returns from step S1107 to step S1106.

In step S1108, the control unit 201 performs a process for resetting the data included in the predetermined table 500. The control unit 201 resets the status data, the second version data, and the power supply data. In this case, the flowchart is ended.

In step S1109, the control unit 201 performs a command reception process described below. The command reception process is a process for performing an operation according to the command received by the first communication unit 206 in step S1106. When the command reception process is performed, in the flowchart, the process returns from step S1109 to step S1106.

(Command Reception Process)

Next, referring to a flowchart illustrated in FIG. 12, the command reception process performed by the electronic device 200 according to the first embodiment will be descried. The command reception process can be realized by the control unit 201 executing a computer program stored in the memory 211.

In step S1201, the control unit 201 determines whether an error has occurred in the communication between the power supply apparatus 100 and the electronic device 200. For example, the control unit 201 determines whether a communication error has occurred by determining whether the command received by the first communication unit 206 includes an abnormal value. When it is determined that the command received by the first communication unit 206 includes an abnormal value, the control unit 201 determines that a communication error has occurred. When it is determined that the communication error has occurred (YES in step S1201), in the flowchart, the process proceeds from step S1201 to step S1212. When the command received by the first communication unit 206 does not include any abnormal value, the control unit 201 determines that a communication error has not occurred. When it is determined that no communication error has occurred (NO in step S1201), in the flowchart, the process proceeds from step S1201 to step S1202.

In step S1202, the control unit 201 determines whether the command received by the first communication unit 206 is a second command. For example, the control unit 201 determines whether the command received by the first communication unit 206 is a second command according to whether any one of "D6h" and "D7h" is included in the command received by the first communication unit 206. When it is determined that the command received by the first communication unit 206 is a second command (YES in step S1202), in the flowchart, the process proceeds from step S1202 to step S1205. When it is determined that the command received by the first communication unit 206 is not a second command (NO in step S1202), in the flowchart, the process proceeds from step S1202 to step S1203.

In step S1203, the control unit 201 reads data corresponding to an address value included in the command received by the first communication unit 206 from the predetermined table 500. In this case, in the flowchart, the process proceeds from step S1203 to step S1204.

In step S1204, the control unit 201 controls the first communication unit 206 to transmit first response data including the data read in step S1203 to the power supply apparatus 100. In this case, the flowchart is ended, and the process returns to step S1106 illustrated in FIG. 11.

In step S1205, the control unit 201 writes the data included in the command received by the first communication unit 206 in the predetermined table 500. In this case, in the flowchart, the process proceeds from step S1205 to step S1206.

In step S1206, the control unit 201 determines whether the command received by the first communication unit 206 includes data for notifying the electronic device 200 of starting power supply. When it is determined that the command received by the first communication unit 206 includes data for notifying the electronic device 200 of starting power supply (YES in step S1206), in the flowchart, the process proceeds from step S1206 to step S1207. When it is determined that the command received by the first communication unit 206 does not include any data for notifying the electronic device 200 of starting power supply (NO in step S1206), in the flowchart, the process proceeds from step S1206 to step S1209.

In step S1207, the control unit 201 controls the charging control unit 209 to start charging the battery 210. After the charging control unit 209 has started charging the battery 210, in the flowchart, the process proceeds from step S1207 to step S1208.

In step S1208, the control unit 201 controls the first communication unit 206 to transmit second response data indicating normal completion of writing of the data included in the second command received by the first communication unit 206 to the power supply apparatus 100. In this case, the flowchart is ended, and the process returns to step S1106 illustrated in FIG. 11.

In step S1209, the control unit 201 determines whether the command received by the first communication unit 206 includes data for notifying the electronic device 200 of stopping power supply. When it is determined that the command received by the first communication unit 206 includes data for notifying the electronic device 200 of stopping power supply (YES in step S1209), in the flowchart, the process proceeds from step S1209 to step S1210. When it is determined that the command received by the first communication unit 206 does not include any data for notifying the electronic device 200 of stopping power supply (NO in step S1209), in the flowchart, the process proceeds from step S1209 to step S1211.

In step S1210, the control unit 201 controls the charging control unit 209 to stop charging the battery 210. After the charging control unit 209 has stopped charging the battery 210, in the flowchart, the process proceeds from step S1210 to step S1208.

In step S1211, the control unit 201 determines whether the first version data and the second version data match each other. When it is determined that the first version data and the second version data match each other (YES in step S1211), in the flowchart, the process proceeds from step S1211 to step S1208. When it is determined that the first version data and the second version data do not match each other (NO in step S1211), in the flowchart, the process proceeds from step S1211 to step S1212.

In step S1212, the control unit 201 controls the first communication unit 206 so as to transmit response data indicating an error to the power supply apparatus 100. In this case, the flowchart is ended. After the process in step S212, the control unit 201 may control the first communication unit 206 to end the communication with the power supply apparatus 100.

The communication process illustrated in FIG. 11 and the command reception process illustrated in FIG. 12 are performed by the control unit 201. However, in place of the control unit 201, the first communication unit 206 may carry out the communication process illustrated in FIG. 11 and the command reception process illustrated in FIG. 12.

Thus, the electronic device 200 according to the first embodiment stores the data for identifying the electronic device 200 and the data indicating the status of the electronic device 200 in the predetermined table 500 in a readable state by the power supply apparatus 100. This enables the power supply apparatus 100 to identify the electronic device 200 or accurately detect the status of the electronic device 200 only by reading desired data from the predetermined table 500. Further, the power supply apparatus 100 can control power supply to the electronic device 200 by using the data read from the predetermined table 500.

The power supply apparatus 100 according to the first embodiment writes data relating to wireless power supply in the predetermined table 500. This enables the electronic device 200 to accurately detect the status of the power supply apparatus 100 and the status of the wireless power supply only by reading desired data from the predetermined table 500. Further, the electronic device 200 can control charging of the battery 210 by using the data read from the predetermined table 500.

As a result, the power supply apparatus 100 controls the wireless power supply to the electronic device 200 according to the communication with the electronic device 200, thereby enabling appropriate charging at the electronic device.

In the first embodiment, the first frequency and the second frequency are similar. However, the first frequency and the second frequency may be different. In this case, for example, the first frequency is 13.56 MHz, and the second frequency may only be required to be different from the first frequency. For example, the second frequency may be 6.78 MHz, or several tens of MHz. The second frequency may be a frequency from 100 KHz to 205 KHz.

In the first embodiment, the predetermined power supply method is a power supply method using the magnetic field resonance method. However, the predetermined power supply method is not limited to the power supply method using the magnetic field resonance method. Thus, for example, the predetermined power supply method may be, in place of the power supply method using the magnetic field resonance method, a power supply method using an electromagnetic induction method or a power supply method using an electric field coupling method. The predetermined power supply method may be, for example, a power supply method using a "Qi" standard defined by Wireless Power Consortium (WPC). The predetermined power supply method may be, for example, a power supply method using a standard defined by Alliance for Wireless Power (A4WP).

In the power supply apparatus 100, the power supply to the electronic device 200 and the communication with the electronic device 200 are carried out by using the power supply antenna 109. However, the present invention is not limited to this. For example, the power supply apparatus 100 may separately include an antenna for performing power supply to the electronic device 200 and an antenna for performing communication with the electronic device 200. In such a power supply apparatus 100, the control unit 101 performs the control process illustrated in FIG. 7, the first authentication process illustrated in FIG. 8, the second authentication process illustrated in FIG. 9, and the power supply process illustrated in FIG. 10.

In the electronic device 200, the power reception from the power supply apparatus 100 and the communication with the power supply apparatus 100 are carried out by using the power reception antenna 203. However, the present invention is not limited to this. For example, the electronic device 200 may separately include an antenna for receiving power from the power supply apparatus 100 and an antenna for performing communication with the power supply apparatus 100. In such an electronic device 200, the control unit 201 performs the communication process illustrated in FIG. 11 and the command reception process illustrated in FIG. 12.

The data included in the predetermined table 500 may be stored in a plurality of memories.

The second communication unit 113 and the second communication unit 213 perform communication based on the wireless LAN standard. However, the second communication unit 113 and the second communication unit 213 may perform communication based on a standard different from the wireless LAN standard in place of the wireless LAN standard. The standard different from the wireless LAN standard is, for example, a Blue Tooth (registered trademark) standard or a Transfer Jet standard.

The power supply apparatus according to the present invention is not limited to the power supply apparatus 100 described according to the first embodiment. For example, the power supply apparatus according to the present invention can be realized by a system including a plurality of apparatuses. The electronic device according to the present invention is not limited to the electronic device 200 described according to the first embodiment. For example, the electronic device according to the present invention can be realized by a system including a plurality of apparatuses.

Various processes and functions described according to the first embodiment can be realized by a computer program. In this case, the processes according to the present invention are executable by the computer program, thus realizing various functions described according to the first embodiment.

Needless to say, the computer program according to the present invention may realize the various processes and functions described according to the first embodiment by using an Operating System (OS) operating on a computer.

The computer program according to the present invention is read from a computer readable recording medium to be executed by the computer. As the computer readable recording medium, a hard disk device, an optical disk, a Compact Disk (CD)-ROM, a CD-R, a memory card, and a ROM can be used. The computer program according to the present invention may be provided from an external apparatus via a communication interface to be executed by the computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST

100 Power supply apparatus
200 Electronic device

The invention claimed is:

1. An electronic device comprising:
a power reception unit configured to receive power from a power supply apparatus based on a first frequency;
a communication unit configured to perform communication with the power supply apparatus based on a second frequency; and
a storage unit configured to store a predetermined table including data corresponding to a first address, data corresponding to a second address, and data corresponding to a third address,
wherein the data corresponding to the first address includes data used for identifying the electronic device,
wherein the data corresponding to the second address includes data indicating a status of the electronic device,
wherein the data corresponding to the third address includes control information for controlling charging processing of the electronic device from the power supply apparatus, and
wherein the data corresponding to the first address is unrewritable from the power supply apparatus and the electronic device, the data corresponding to the second address is rewritable from the electronic device and unrewritable from the power supply apparatus, and the data corresponding to the third address is unrewritable from the electronic device and rewritable from the power supply apparatus.

2. The electronic device according to claim 1, wherein the data corresponding to the first address is readable from the power supply apparatus, the data corresponding to the second address is readable from the power supply apparatus, and the data corresponding to the third address is readable from the electronic device.

3. The electronic device according to claim 1, wherein a predetermined power supplied from the power supply apparatus is set according to the data corresponding to the second address, and the data corresponding to the second address further includes data regarding the battery.

4. The electronic device according to claim 1,
wherein the second address that includes the data indicating the status of the electronic device includes data indicating power received from the power supply apparatus by the electronic device, data indicating power consumption of the electronic device, data indicating an operation of the electronic device, and data indicating a surplus or a shortage of power of the electronic device, and wherein the status of the electronic device is periodically detected.

5. The electronic device according to claim 1, wherein the data corresponding to the first address further includes data regarding a power reception capability of the electronic device.

6. The electronic device according to claim 1, wherein the data corresponding to the third address includes data indicating whether to start supplying the predetermined power.

7. The electronic device according to claim 1, wherein the first command and the second command comply with a NFC Data Exchange Format (NDEF).

8. The electronic device according to claim 1, wherein the second frequency is a frequency complying with a Near Field Communication (NFC) standard.

9. The electronic device according to claim 1, wherein the second frequency is different from the first frequency.

10. The electronic device according to claim 1, wherein the data corresponding to the third address includes data indicating whether to start supplying the predetermined power.

11. A method for controlling an electronic device including a power reception unit configured to receive power based on a first frequency, a communication unit configured to perform communication based on a second frequency, and a storage unit configured to store a predetermined table including data corresponding to a first address, data corresponding to a second address, and data corresponding to a third address,
wherein the data corresponding to the first address is unrewritable from the power supply apparatus and the electronic device, the data corresponding to the second address is rewritable from the electronic device and unrewritable from the power supply apparatus, and the data corresponding to the third address is unrewritable from the electronic device and rewritable from the power supply apparatus,
the method comprising:
reading the data corresponding to a third address;
controlling, in a case where the data corresponding to the third address is written from the power supply apparatus, charging of a battery; and
writing the data corresponding to the second address in a case where a status of the electronic device changes during the charging of the battery.

12. A non-transitory computer-readable storage medium which stores a program for causing an electronic device to execute a method, the electronic device including a power reception unit configured to receive power based on a first frequency, a communication unit configured to perform communication based on a second frequency, and a storage unit configured to store a predetermined table including data corresponding to a first address, data corresponding to a second address, and data corresponding to a third address,
wherein the data corresponding to the first address is unrewritable from the power supply apparatus and the electronic device, the data corresponding to the second address is rewritable from the electronic device and unrewritable from the power supply apparatus, and the data corresponding to the third address is unrewritable from the electronic device and rewritable from the power supply apparatus,
the method comprising:
reading the data corresponding to a third address;
controlling, in a case where the data corresponding to the third address is written from the power supply apparatus, charging of a battery; and
writing the data corresponding to the second address in a case where a status of the electronic device changes during the charging of the battery.

13. An electronic device comprising:
a power reception unit configured to receive power from a power supply apparatus;
a communication unit configured to perform communication with the power supply apparatus; and
a storage unit configured to store a predetermined table including data corresponding to a first address, data corresponding to a second address, and data corresponding to a third address,
wherein the data corresponding to the first address includes data used for identifying the electronic device,
wherein the data corresponding to the second address includes data indicating a status of the electronic device,
wherein the data corresponding to the third address includes control information for controlling charging processing of the electronic device from the power supply apparatus, and
wherein the data corresponding to the first address is unrewritable by instruction from the power supply apparatus and the electronic device, the data corresponding to the second address is rewritable by instruction from the electronic device and unrewritable by instruction from the power supply apparatus, and the data corresponding to the third address is unrewritable by instruction from the electronic device and rewritable by instruction from the power supply apparatus.

14. The electronic device according to claim 13, wherein the data corresponding to the first address is readable from the power supply apparatus, the data corresponding to the second address is readable from the power supply apparatus, and the data corresponding to the third address is readable from the electronic device.

15. The electronic device according to claim 13, wherein a predetermined power supplied from the power supply apparatus is set according to the data corresponding to the second address, and the data corresponding to the second address further includes data regarding the battery.

16. The electronic device according to claim 13,
wherein the second address that includes the data indicating the status of the electronic device includes data indicating power received from the power supply apparatus by the electronic device, data indicating power consumption of the electronic device, data indicating an operation of the electronic device, and data indicating a surplus or a shortage of power of the electronic device, and
wherein the status of the electronic device is periodically detected.

17. The electronic device according to claim 13, wherein the data corresponding to the first address further includes data regarding a power reception capability of the electronic device.

18. The electronic device according to claim 13, wherein the first command and the second command comply with a NFC Data Exchange Format (NDEF).

19. A method for controlling an electronic device including a power reception unit configured to receive power, a communication unit configured to perform communication, and a storage unit configured to store a predetermined table including data corresponding to a first address, data corresponding to a second address, and data corresponding to a third address, wherein the data corresponding to the first address is unrewritable by instruction from the power supply apparatus and the electronic device, the data corresponding to the second address is rewritable by instruction from the electronic device and unrewritable by instruction from the power supply apparatus, and the data corresponding to the third address is unrewritable by instruction from the electronic device and rewritable by instruction from the power supply apparatus, the method comprising:

reading the data corresponding to a third address;

controlling, in a case where the data corresponding to the third address is written from the power supply apparatus, charging of a battery; and writing the data corresponding to the second address in a case where a status of the electronic device changes during the charging of the battery.

20. A non-transitory computer-readable storage medium which stores a program for causing an electronic device to execute a method, the electronic device including a power reception unit configured to receive power, a communication unit configured to perform communication, and a storage unit configured to store a predetermined table including data corresponding to a first address, data corresponding to a second address, and data corresponding to a third address, wherein the data corresponding to the first address is unrewritable by instruction from the power supply apparatus and the electronic device, the data corresponding to the second address is rewritable by instruction from the electronic device and unrewritable by instruction from the power supply apparatus, and the data corresponding to the third address is unrewritable by instruction from the electronic device and rewritable by instruction from the power supply apparatus, the method comprising:

reading the data corresponding to a third address;

controlling, in a case where the data corresponding to the third address is written from the power supply apparatus, charging of a battery; and writing the data corresponding to the second address in a case where a status of the electronic device changes during the charging of the battery.

* * * * *